United States Patent
Watarai et al.

(10) Patent No.: US 11,203,395 B2
(45) Date of Patent: Dec. 21, 2021

(54) BICYCLE SPROCKET AND BICYCLE SPROCKET ASSEMBLY

(71) Applicant: Shimano Inc., Osaka (JP)

(72) Inventors: Etsuyoshi Watarai, Osaka (JP); Koji Yuasa, Osaka (JP)

(73) Assignee: Shimano Inc., Osaka (JP)

( * ) Notice: Subject to any disclaimer, the term of this patent is extended or adjusted under 35 U.S.C. 154(b) by 68 days.

(21) Appl. No.: 16/455,507

(22) Filed: Jun. 27, 2019

(65) Prior Publication Data

US 2019/0315434 A1    Oct. 17, 2019

Related U.S. Application Data

(62) Division of application No. 15/218,677, filed on Jul. 25, 2016, now abandoned.

(30) Foreign Application Priority Data

Oct. 9, 2015 (JP) .............................. JP2015-200837
Feb. 2, 2016 (JP) .............................. JP2016-018340

(51) Int. Cl.
*B62M 9/10* (2006.01)
*B21K 23/00* (2006.01)
*B21K 1/30* (2006.01)
*B62M 9/02* (2006.01)
*F16H 55/30* (2006.01)

(52) U.S. Cl.
CPC ............... *B62M 9/105* (2013.01); *B21K 1/30* (2013.01); *B21K 23/00* (2013.01); *B62M 9/02* (2013.01); *B62M 9/10* (2013.01); *F16H 55/30* (2013.01)

(58) Field of Classification Search
CPC .......... F16H 55/30; B62M 9/105; B62M 9/10
USPC ....................................................... 474/156
See application file for complete search history.

(56) References Cited

U.S. PATENT DOCUMENTS

| 3,745,851 | A | * | 7/1973 | Zeldman | ................. F16H 55/30 474/152 |
| 4,144,773 | A | * | 3/1979 | Addicks | ................. B62M 9/105 403/3 |
| 4,174,642 | A | * | 11/1979 | Martin | ................... F16H 55/30 474/152 |
| 4,527,987 | A | * | 7/1985 | Berchem | ................. C22C 38/44 148/224 |

(Continued)

FOREIGN PATENT DOCUMENTS

CN    103144734 A    6/2013

*Primary Examiner* — Henry Y Liu
(74) *Attorney, Agent, or Firm* — Global IP Counselors, LLP

(57) ABSTRACT

A method of making a bicycle sprocket having a rotational center axis basically includes providing an annular portion and forming a first tooth and a second tooth. The annular portion is made of a base material and has a plurality of teeth. At least one of the teeth is processed to form a first tooth, and at least one other of the teeth is processed to form a second tooth. The first tooth has a first axial chain engaging width that is smaller than a first axial spacing of an outer link of a bicycle chain and larger than a second axial spacing of an inner link that is coupled to an outer link. The second tooth is formed to have a second axial chain engaging width that is smaller than the second axial spacing. The second tooth is formed by deforming the base material.

5 Claims, 13 Drawing Sheets

(56) References Cited

U.S. PATENT DOCUMENTS

| | | | | |
|---|---|---|---|---|
| 4,828,537 A * | 5/1989 | Jourdain | B62M 9/10 | 29/892.1 |
| 5,192,248 A * | 3/1993 | Nagano | B62M 9/10 | 474/140 |
| 5,380,254 A * | 1/1995 | Maguire | B21K 1/30 | 474/152 |
| 5,413,534 A * | 5/1995 | Nagano | B62M 9/10 | 474/160 |
| 5,738,603 A * | 4/1998 | Schmidt | B62M 9/10 | 474/158 |
| 6,007,442 A * | 12/1999 | Schmidt | B62M 9/10 | 474/122 |
| 6,367,300 B1 | 4/2002 | Takamori | | |
| 6,572,500 B2 * | 6/2003 | Tetsuka | B62M 9/10 | 474/160 |
| 6,860,171 B1 * | 3/2005 | Nanko | B62M 3/003 | 474/160 |
| 9,701,364 B2 * | 7/2017 | Sugimoto | B62M 9/105 | |
| 2002/0006842 A1 * | 1/2002 | Tetsuka | B62M 9/10 | 474/160 |
| 2005/0215367 A1 * | 9/2005 | Thomasberg | B62M 9/14 | 474/78 |
| 2006/0073925 A1 * | 4/2006 | Kaga | B62M 9/04 | 474/78 |
| 2006/0264286 A1 * | 11/2006 | Hodjat | F16H 55/171 | 474/152 |
| 2007/0054768 A1 * | 3/2007 | Miyazawa | F16H 55/30 | 474/152 |
| 2007/0265122 A1 * | 11/2007 | Emura | B62M 9/105 | 474/152 |
| 2008/0178698 A1 * | 7/2008 | Tanaka | F16H 55/30 | 74/467 |
| 2010/0050810 A1 * | 3/2010 | Nakatani | B62M 9/105 | 74/594.2 |
| 2010/0075791 A1 * | 3/2010 | Braedt | B62M 9/10 | 474/160 |
| 2010/0081530 A1 * | 4/2010 | Crump | B21K 1/30 | 474/152 |
| 2011/0079982 A1 * | 4/2011 | Patterson | B62M 9/12 | 280/261 |
| 2011/0306453 A1 * | 12/2011 | Kawahara | B21J 5/02 | 474/162 |
| 2011/0319209 A1 * | 12/2011 | Huang | B62M 9/105 | 474/164 |
| 2013/0139642 A1 * | 6/2013 | Reiter | B62M 9/105 | 74/594.2 |
| 2013/0274046 A1 * | 10/2013 | Saccucci | F16H 55/303 | 474/160 |
| 2014/0248982 A1 * | 9/2014 | Schuster | B62M 9/14 | 474/69 |
| 2014/0338494 A1 * | 11/2014 | Sugimoto | F16H 55/30 | 74/594.2 |
| 2014/0364259 A1 * | 12/2014 | Reiter | B62M 9/10 | 474/155 |
| 2015/0198231 A1 * | 7/2015 | Emura | F16H 7/06 | 474/156 |
| 2015/0203173 A1 * | 7/2015 | Nishimoto | B62M 9/02 | 474/152 |
| 2015/0211623 A1 * | 7/2015 | Inui | B23K 15/04 | 474/152 |
| 2015/0226305 A1 * | 8/2015 | Pfeiffer | B62M 9/105 | 474/152 |
| 2015/0226306 A1 * | 8/2015 | Pfeiffer | B62M 9/105 | 474/152 |
| 2015/0226307 A1 * | 8/2015 | Pfeiffer | B62M 9/105 | 474/152 |
| 2015/0226308 A1 * | 8/2015 | Pfeiffer | B62M 9/10 | 474/152 |
| 2015/0285362 A1 * | 10/2015 | Pfeiffer | B62M 9/10 | 474/152 |
| 2015/0285363 A1 * | 10/2015 | Pfeiffer | F16H 55/30 | 474/152 |
| 2015/0285364 A1 * | 10/2015 | Pfeiffer | B62M 9/10 | 474/152 |
| 2015/0291255 A1 * | 10/2015 | Nishimoto | B62M 9/06 | 474/152 |
| 2015/0337943 A1 * | 11/2015 | Sugimoto | B62M 9/00 | 474/152 |

* cited by examiner

BICYCLE SPROCKET AND BICYCLE SPROCKET ASSEMBLY

CROSS-REFERENCE TO RELATED APPLICATIONS

This application is a divisional application of U.S. patent application Ser. No. 15/218,677, which was filed on Jul. 25, 2016. This application claims priority to Japanese Patent Application No. 2015-200837, filed on Oct. 9, 2015, and Japanese Patent Application No. 2016-018340, filed on Feb. 2, 2016. The entire disclosures of Japanese Patent Application Nos. 2015-200837 and 2016-018340 and U.S. patent application Ser. No. 15/218,677 are hereby incorporated herein by reference.

BACKGROUND

Field of the Invention

The present invention generally relates to a method of making a bicycle sprocket and a bicycle sprocket assembly.

Background Information

A conventional bicycle sprocket is provided to both a crank assembly and a rear wheel. A chain is engaged with the sprocket of the crank assembly and the sprocket of the rear wheel. Accordingly, the rotation of the crank assembly is transmitted to the rear wheel via the chain.

In a chain, inner link plates and outer link plates are alternately coupled together to form a continuous loop. Further, the space between a pair of inner link plates facing each other is formed to be smaller than the space between a pair of outer link plates facing each other. Accordingly, if the sprocket teeth are formed so that the thickness (engaging width) of all of the sprocket teeth are the same, the gap between the outer link plates and the sprocket teeth will be larger than the gap between the inner link plates and the sprocket teeth, in the thickness direction of the sprocket.

In this kind of conventional structure, the engagement between the chain and the sprocket tend to become loose, due to the gap between the outer link plates and the sprocket teeth in the thickness direction of the sprocket. Thus, a sprocket is proposed, which is formed so that the thickness of the teeth that engage the outer link plates is larger than the thickness of the teeth that engage the inner link plates (refer to U.S. Patent Application Publication No. 2013/0139642).

SUMMARY

Generally, the present disclosure is directed to various features of a bicycle sprocket. In one feature, a bicycle sprocket is provided with a first tooth and a second tooth in which the axial thickness or width of the first teeth is different from the axial thickness or width of the second tooth for increasing a chain holding force between the first and second teeth and the chain.

In some conventional sprockets, the thickness of the teeth that engage the outer link plates is made larger than the thickness of the teeth that engage the inner link plates by cutting the teeth that engage the inner link plates (for example, refer to U.S. Patent Application Publication No. 2013/0139642, paragraph [0045]).

In this case, there is a problem that the processing time to form a sprocket increases due to the additional time for cutting the teeth that engage the inner link plates. That is, when producing the above mentioned sprocket, it was difficult to improve the productivity of the sprocket.

The present invention was developed in light of the above-described problem, and one object of the present invention is to provide a bicycle sprocket having high chain holding force and excellent productivity. Further, an object of the present invention is to provide a bicycle sprocket assembly having high chain holding force and excellent productivity.

In view of the state of the known technology and in accordance with a first aspect of the present disclosure, a method of making a bicycle sprocket having a rotational center axis is provided. The method comprising providing an annular portion and forming a first tooth and a second tooth. The annular portion is made of a base material and has a plurality of teeth integrally formed on an outer perimeter of the annular portion. At least one of the plurality of teeth is processed to form the first tooth, and at least one other of the plurality of teeth is processed to form the second tooth. The first tooth is formed to have a first axial chain engaging width that is smaller than a first axial spacing of an outer link of a bicycle chain and larger than a second axial spacing of an inner link coupled to the outer link. The second tooth is formed to have a second axial chain engaging width that is smaller than the second axial spacing. The second tooth being formed by deforming the base material.

In the bicycle sprocket made according to the present method, the first axial chain engaging width of the first tooth is smaller than the first axial spacing in the outer link, and larger than the second axial spacing in the inner link. Further, the second axial chain engaging width of the second tooth is smaller than the second axial spacing. Accordingly, the chain can be held securely by the sprocket. Further, since the second tooth is formed by deformation of the material, the productivity of the sprocket can be improved compared to that of the prior art.

In accordance with a second aspect of the present invention, the method of making a bicycle sprocket includes forming a recess in the first tooth, the recess being configured to minimize interference with the inner link. In this way, even if the first tooth is disposed between the outer link, excessive interference with the inner link can be avoided by the recess.

In accordance with a third aspect of the present invention, the method of making a bicycle sprocket includes forming the recess and the second tooth together by the press working. Since the recess and the second tooth are formed together by press working, the productivity of bicycle sprocket can be improved.

In accordance with a fourth aspect of the present invention, the method of making a bicycle sprocket includes forming four of the recesses in the first tooth such that the first tooth has a plus-sign shape when viewed from a radially outer side. Thus, the first tooth can be even more reliably prevented from interfering with the inner link of the bicycle chain.

In accordance with a fifth aspect of the present invention, the method of making a bicycle sprocket includes forming the four recesses and the second tooth together by the press working. In this way, by forming the four recesses and the second tooth together by press working, the first tooth can be even more reliably prevented from interfering with the inner link of the bicycle chain while also improving the productivity of the bicycle sprocket.

In accordance with a sixth aspect of the present invention, the method of making a bicycle sprocket includes forming the second tooth using a first press working step, a cutting step performed after the first press working step, and a second press working step performed after the cutting step. In this way, the second tooth can be formed reliably and accurately.

In accordance with a seventh aspect of the present invention, the first press working step includes pressing one axial side of the second tooth and forming a protrusion on an opposite axial side of the second tooth, the cutting step includes cutting the protrusion, and the second press working step includes pressing the opposite axial side of the second tooth to achieve the second axial chain engaging width.

In accordance with an eighth aspect of the present invention, a method of making a bicycle sprocket having a rotational center axis is provided. The method comprises providing an annular portion and forming a first tooth and a second tooth. The annular portion is made of a base material having a plurality of teeth integrally formed on an outer perimeter of the annular portion. At least one of the plurality of teeth is processed to form the first tooth, and at least one other of the plurality of teeth is processed to form the second tooth. The first tooth is formed to have a maximum axial width smaller than a first axial chain engaging width, which is smaller than a first axial spacing of an outer link of a bicycle chain and larger than a second axial spacing of an inner link coupled to the outer link. Four recesses are formed in the first tooth such that the first tooth has a plus-sign shape when viewed from a radially outer side. A first additional portion is attached to the first tooth to expand the maximum axial width of the first tooth to the first axial chain engaging width. The second tooth is formed to have a second axial chain engaging width that is smaller than the second axial spacing. The second tooth is formed by deforming the base material.

With the eight aspect of the present invention, the first axial chain engaging width of the first tooth is smaller than the first axial spacing in the outer link, and larger than the second axial spacing in the inner link. Further, the second axial chain engaging width of the second tooth is smaller than the second axial spacing. Accordingly, the chain can be held securely by the sprocket. Further, since the second tooth is formed by deformation of the material, the productivity of the sprocket can be improved compared to that of the prior art. Also, with the eight aspect, the material of the additional portion can be chosen freely by attaching the additional portion to the main body portion.

In accordance with a ninth aspect of the present invention, the method of making a bicycle sprocket includes forming the four recesses in the fourth tooth and forming the second tooth together by the press working. Since the recess and the second tooth are formed together by press working, the productivity of bicycle sprocket can be improved.

According to the present invention, a bicycle sprocket having high chain holding force and excellent productivity can be provided. Further, a bicycle sprocket assembly having high chain holding force and excellent productivity can be provided.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
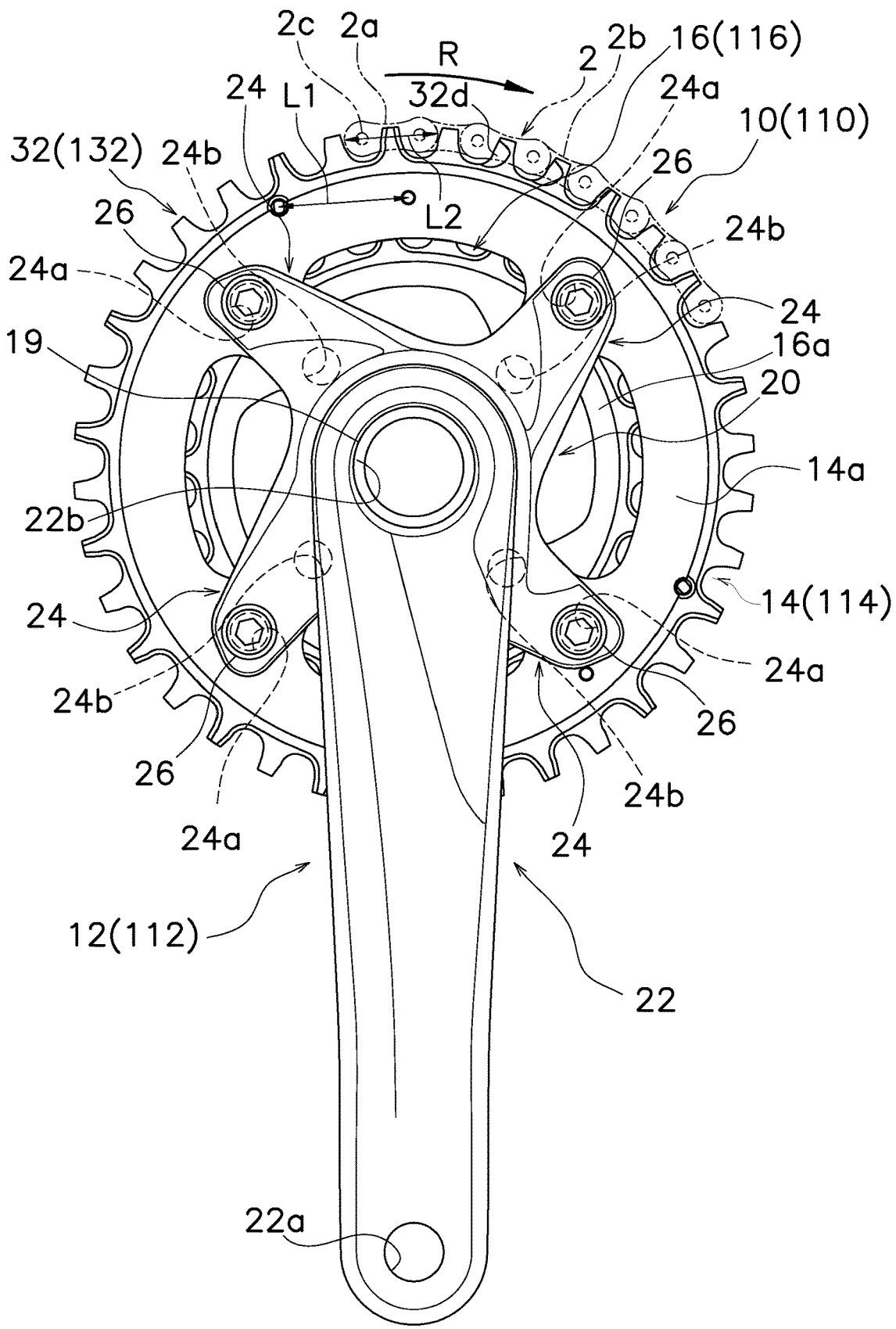
FIG. 1 is a front side elevational view of a bicycle crank assembly in accordance with first and second embodiments.

As shown in FIG. 1, a bicycle crank assembly 10 (hereinafter referred to as crank assembly) is illustrated in accordance with a first embodiment. The bicycle crank assembly 10 basically comprises a crank arm 12, a first sprocket 14 (an example of a bicycle sprocket), and a second sprocket 16 (an example of a bicycle sprocket). Further, the first sprocket 14 and the second sprocket 16 are examples of a bicycle sprocket assembly.

In the crank assembly 10, the first sprocket 14 and the second sprocket 16 are front sprockets that are configured to engage with a bicycle chain 2. The second sprocket 16 has fewer teeth than the first sprocket 14. The bicycle chain 2 comprises a plurality of pairs of outer link plates 2a, a plurality of pairs of inner link plates 2b and a plurality of chain rollers 2c. The chain rollers 2c couple adjacent pairs of the outer link plates 2a and the inner link plates 2b.

Crank Arm

The crank arm 12 is integrally and non-rotatably coupled to a crankshaft 19. The crank arm 12 comprises a sprocket attaching portion 20 and an arm portion 22. The arm portion 22 is non-rotatably with respect to the sprocket attaching portion 20. The arm portion 22 is provided integrally with the sprocket attaching portion 20 as a non-separable member, or separately detachable from the sprocket attaching portion 20.

The sprocket attaching portion 20 comprises a plurality (for example, four) of sprocket attaching arms 24. The sprocket attaching arms 24 are disposed in the circumferential direction with spaces therebetween. The intervals of the sprocket attaching arms 24 in the circumferential direction are regular intervals. Here, an example is shown of a case in which the intervals of the sprocket attaching arms 24 in the circumferential direction are regular intervals, but the intervals of the sprocket attaching arms 24 in the circumferential direction can be irregular intervals.

Each of the sprocket attaching arms 24 comprises a first attaching portion 24a and a second attaching portion 24b. The first attaching portions 24a are configured for attaching the first sprocket 14. The first attaching portions 24a are formed on distal end portions of the sprocket attaching arms 24. Each of the first attaching portions 24a is, for example, a through-hole. The first sprocket 14 is fixed to the first attaching portions 24a.

The second attaching portions 24b are configured for attaching the second sprocket 16. The second attaching portions 24b are formed on proximal end portions of the sprocket attaching arms 24, radially inward from the first attaching portions 24a. The second attaching portions 24b are, for example, blind screw holes. The second sprocket 16 is fixed to the second attaching portions 24b.

The arm portion 22 is provided integrally with or separately from the sprocket attaching portion 20. Here, the arm portion 22 is formed integrally with the sprocket attaching portion 20. A pedal attaching portion 22a is provided on the distal end portion of the arm portion 22. A pedal (not shown) can be mounted to the pedal attaching portion 22a. A coupling hole 22b is provided to the proximal end portion of the arm portion 22. The crankshaft 19 is integrally and non-rotatably coupled to the coupling hole 22b.

First Sprocket

As shown in FIGS. 2 to 5, the first sprocket 14 comprises a rotational center axis X. The first sprocket 14 comprises a first sprocket body 30 (an example of a main body portion), a first annular portion 31 (an example of an annular portion), a plurality of teeth 32 (an example of a first tooth portion and a second tooth portion), and a pair of first shift regions 34 (refer to FIGS. 3 and 4; an example of a shift region).

Figure 2:
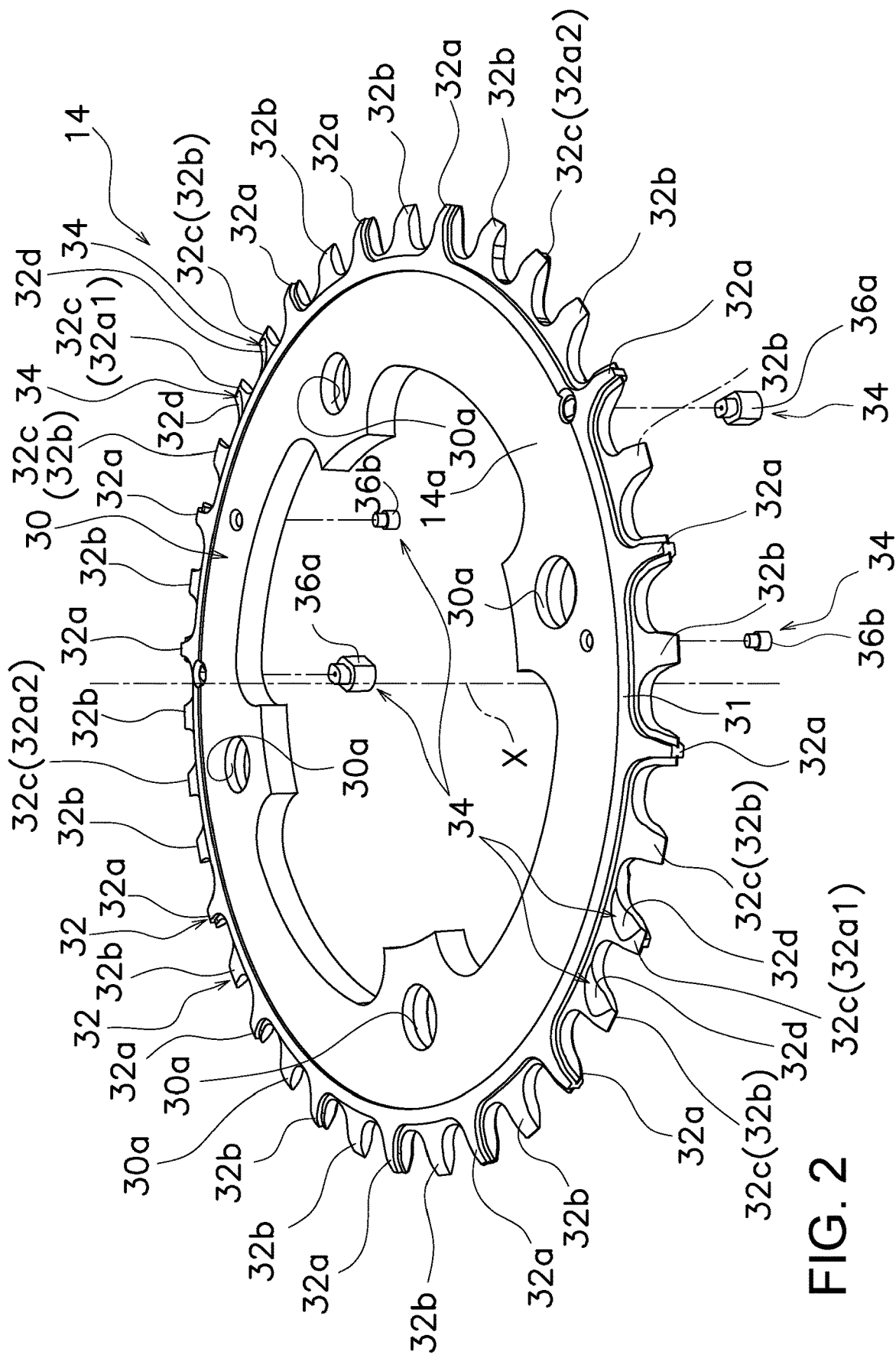
FIG. 2 is a front side oblique view of the first sprocket of the bicycle crank assembly illustrated in FIG. 1 according to the first embodiment.
Figure 3:
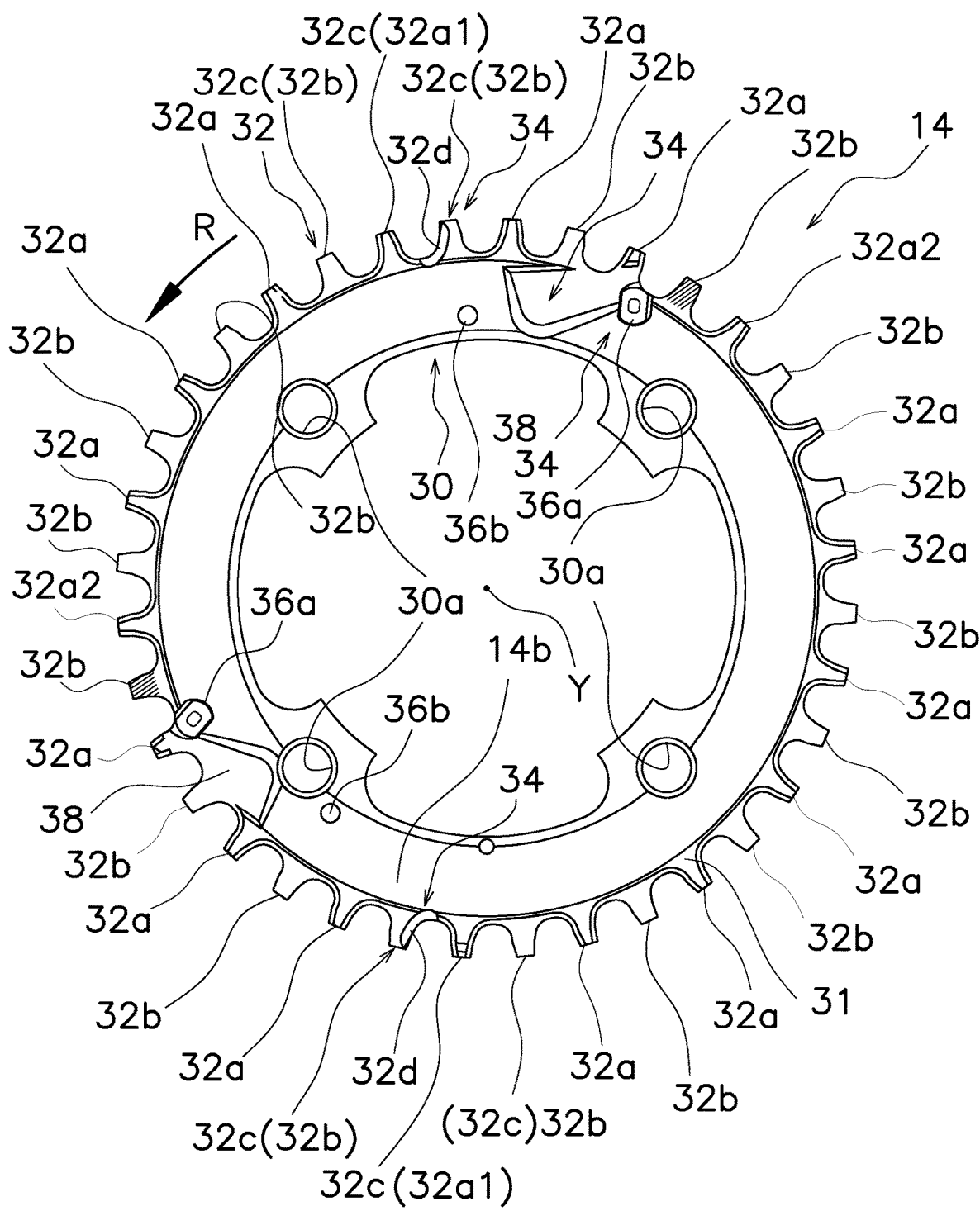
FIG. 3 is a rear side elevational view of the first sprocket according to the first embodiment.
Figure 4:
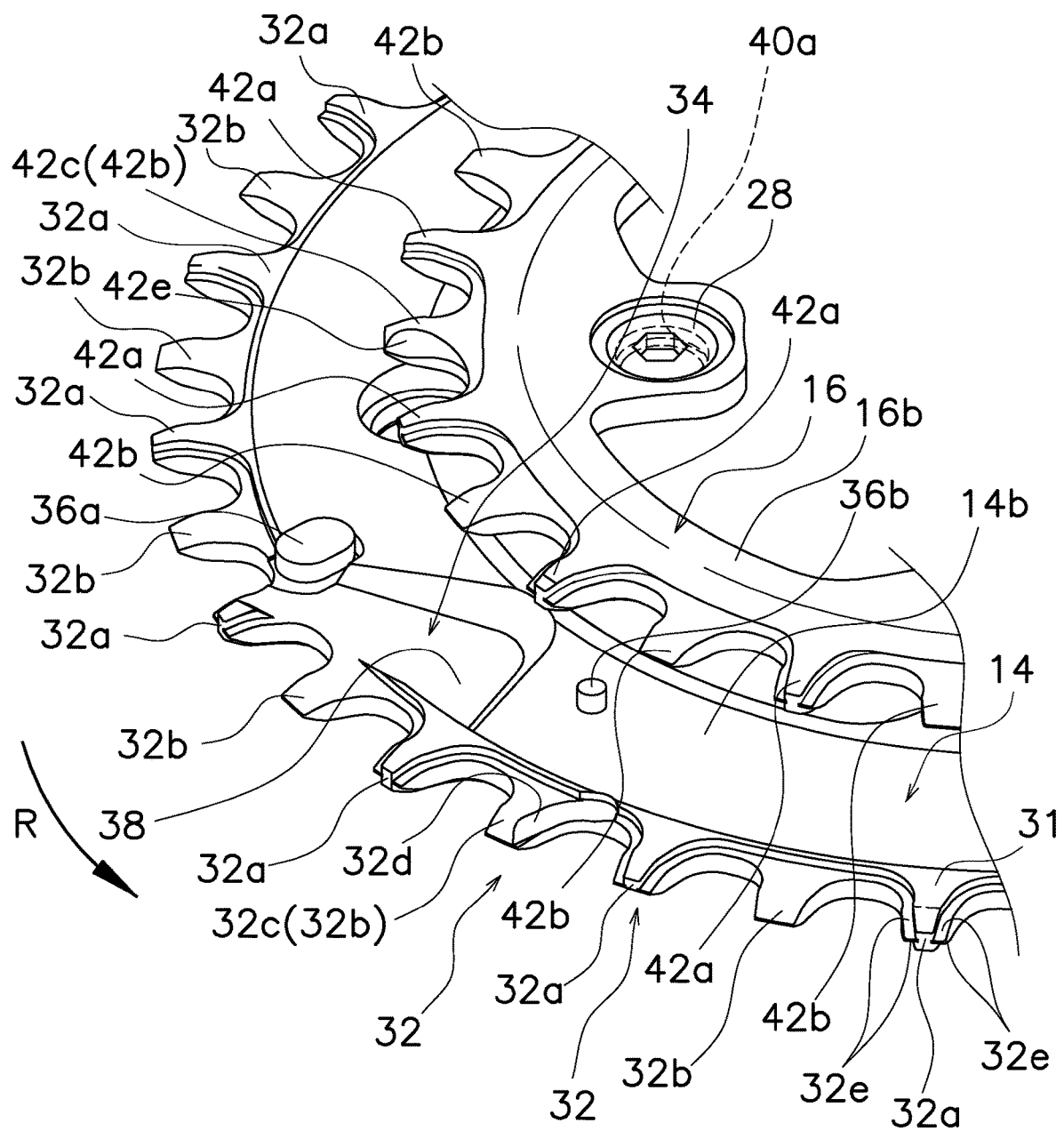
FIG. 4 is a partial rear side oblique view of the first and second sprockets according to the first embodiment.

The first sprocket body 30 is non-metallic, and made of synthetic resin such as carbon fiber-reinforced resin. The first sprocket body 30 is formed integrally with the first annular portion 31. As shown in FIGS. 2 to 4, the first sprocket body 30 comprises a plurality (for example, four) of first fixing portions 30a. The plurality of first fixing portions 30a are disposed in the circumferential direction with spaces therebetween.

Each of the first fixing portions 30a is, for example, a through-hole. Each of the first fixing portions 30a is disposed in an opposing position relative to each of the first attaching portions 24a. In this state, a first fixing bolt 26 (refer to FIG. 1) is inserted through each of the first fixing portion 30a and each of the first attaching portion 24a, and is screwed to a nut member (not shown). With this, the first sprocket body 30 is non-movably fixed to the sprocket attaching arms 24.

The first annular portion 31 is attached to the first sprocket body 30. Specifically, the first annular portion 31 is attached to the outer perimeter of the first sprocket body 30. The first annular portion 31 is made of metal, such as aluminum, titanium, or iron/stainless steel. A plurality of teeth 32 are formed on the outer perimeter of the first annular portion 31.

The plurality of teeth 32 include a first tooth 32a and a second tooth 32b as described below. The plurality of teeth 32 are provided to the outer perimeter of the first annular portion 31. Specifically, the plurality of teeth 32 (for example, from a total number of 30 to 60) are disposed side-by-side in the circumferential direction on the outer perimeter of the first annular portion 31. The teeth 32 are formed integrally with the outer perimeter portion of the first annular portion 31. The plurality of teeth 32 are made of metal, such as aluminum, titanium, or, iron/stainless steel.

As mentioned above, the plurality of teeth 32 comprise a plurality of the first teeth 32a (an example of a first tooth) and a plurality of the second teeth 32b (an example of a second tooth). The first tooth 32a and the second tooth 32b are disposed alternately in the circumferential direction, that is, side-by-side in the circumferential direction.

The first tooth 32a is formed to be engageable with the outer link plates 2a. Specifically, the first tooth 32a is formed to be engageable between the pairs of the outer link plates 2a in the axial direction. The first tooth 32a is formed in a divergently tapered shape so that the width in the axial direction gradually becomes smaller toward the radially outer side. The axial direction includes the direction in which the rotational center axis X extends, and the directions that are parallel to the rotational center axis X. The axial direction used here corresponds to the directions that are parallel to the rotational center axis X.

As shown in FIG. 4, the first tooth 32a preferably comprises a first recess 32e (an example of a recess). The first recesses 32e are provided to each corner portion of the first tooth 32a. The surfaces of the first recesses 32e that are located on the first side surface 14a are preferably flush with the surfaces of the second tooth 32b on the first side surface 14a. Similarly, the surfaces of the first recesses 32e on the second side surface 14b are preferably flush with the surfaces of the second tooth 32b on the second side surface 14b.

Here, the first side surface 14a (refer to FIG. 1) is the front side surface of the crank assembly 10 when mounted on the bicycle. In other words, the first side surface 14a is an outwardly facing side surface that faces axially outward away from the bicycle frame. Further, the second side surface 14b (refer to FIGS. 3 and 4) is the rear side surface of the crank assembly 10 when mounted on the bicycle. In other words, the second side surface 14b is an inwardly facing side surface that faces axially inward towards the bicycle frame. Thus, the second side surface 14b is located closer to the bicycle frame than is the first side surface 14a when the crank assembly 10 is mounted on the bicycle.

The first recesses 32e are formed by press working, such as forging. Here, an example is shown of a case in which the first recesses 32e are formed by press working. However, the first recesses 32e can also be formed by cutting.

Figure 5:
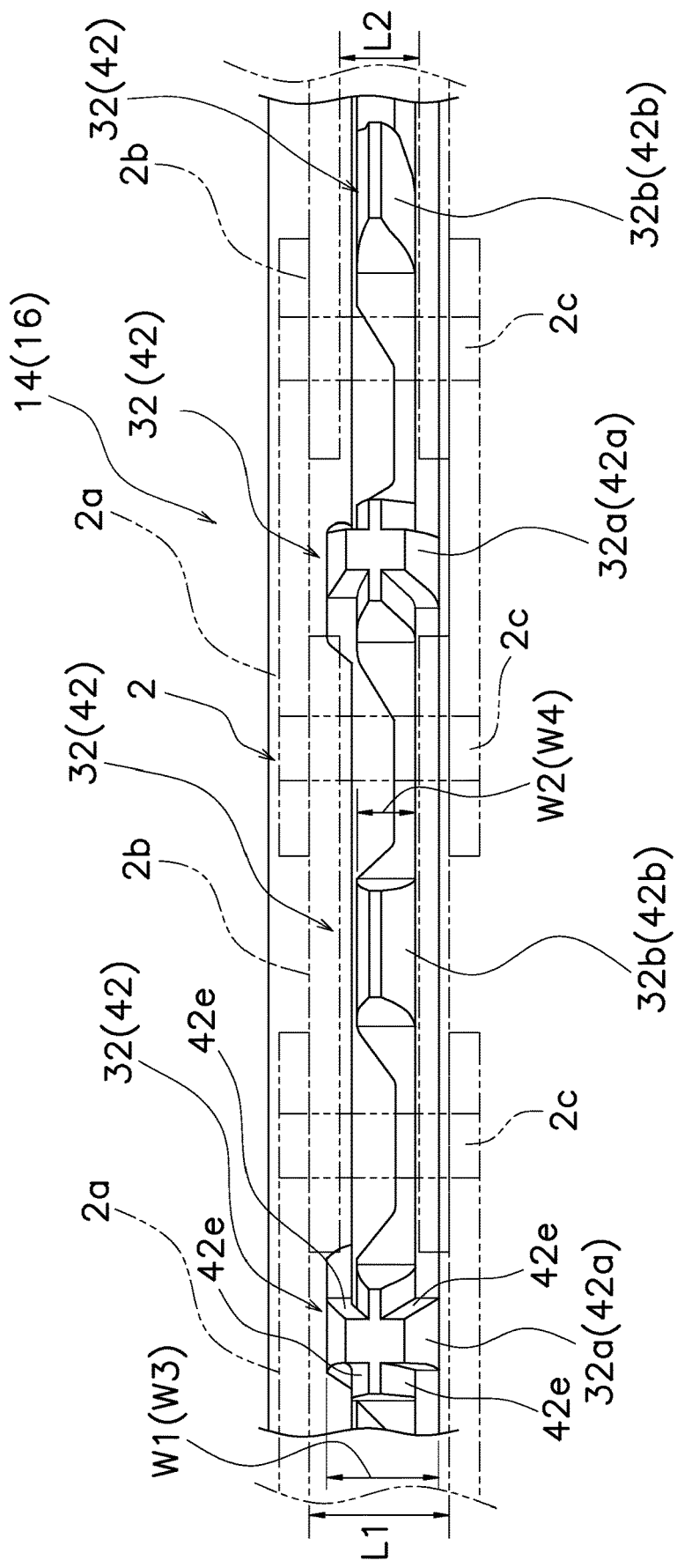
FIG. 5 is a partial edge view of the first sprocket and the second sprocket according to the first embodiment, as seen from a radially outer side direction.

As shown in FIG. 5, the first recesses 32e are formed to face the end portion of the inner link plate 2b to minimize interference between the first teeth 32a and the inner link plates 2b. In this way, excessive interference between the first tooth 32a and the inner link plates 2b can be avoided by the first recesses 32e. Further, as shown in FIGS. 2, 4 and 5, by providing the first recesses 32e to the first tooth 32a, the first tooth 32a (excluding the first tooth 32a1 and the first tooth 32a2 which are for gear shifting) are formed in a substantially + (plus sign) shape, seen from a radially outer side.

Here, as shown in FIGS. 2 to 3, the plurality of first teeth 32a comprises a plurality (for example, two) of first teeth 32a1 configured for gear shifting, and a plurality (for example, two) of first teeth 32a2 configured for gear shifting. The first tooth 32a1 is configured for downshifting in which the chain 2 moves from the first sprocket 14 to the second sprocket 16. The first tooth 32a2 is configured for upshifting in which the chain 2 moves from the second sprocket 16 to the first sprocket 14. The first tooth 32a1 and the first tooth 32a2 are preferably formed in a substantially T-shape, when seen from a radially outer side, by being provided with the first recesses 32e as described above.

As shown in FIG. 5, the first teeth 32a comprise a first maximum axial width W1 (an example of a first axial chain engaging width). The first maximum axial width W1 is the axial width in of the portion where the dimension of the first tooth 32a is the longest in the axial direction. The first maximum axial width W1 is smaller than a first axial spacing L1 in the pairs of the outer link plates 2a. Further, the first maximum axial width W1 is larger than a second axial spacing L2 in the pairs of the inner link plates 2b.

The first axial spacing L1 is the space in the axial direction between the surfaces that face each other of a pair of the outer link plates 2a. The second axial spacing L2 is the space in the axial direction between the surfaces that face each other of a pair of the inner link plates 2b.

As shown in FIGS. 2 to 4, the second tooth 32b is formed to be engageable with the inner link plates 2b. Specifically, the second tooth 32b is formed to be engageable between the pairs of the inner link plates 2b in the axial direction.

The second tooth 32b is preferably formed in a substantially – (minus sign) shape, as seen from a radially outer side. The second tooth 32b is formed in a divergently tapered shape so that the width in the axial direction gradually becomes smaller toward the radially outer side.

As shown in FIG. 5, the second tooth 32b comprises a second maximum axial width W2 (an example of a second axial chain engaging width). The second maximum axial width W2 is the axial width of the portion where the dimension of the second tooth 32b is the longest in the axial direction. The second maximum axial width W2 is smaller than the second axial spacing L2 described above. The second maximum axial width W2 is smaller than the first maximum axial width W1.

The second tooth 32b is formed by processing the second tooth 32b in the following way, thereby obtaining the above configuration. The second tooth 32b is formed by deformation of the base material of the teeth 32. Specifically, the second tooth 32b is formed by press working. More specifically, the second tooth 32b is formed by forging. Specifically, the second tooth 32b is formed together with the first recesses 32e by forging. The second maximum axial width W2 of the second tooth 32b is set by press working, for example, forging the second tooth 32b in this way.

The first shift regions 34 are provided for gear shifting the chain 2. The first shift regions 34 are the regions in which the chain 2 engages with the teeth 32 of the first sprocket 14 during an upshifting operation from the second sprocket 16 to the first sprocket 14. Further, the first shift regions 34 are the regions in which the chain engages with the teeth 32 of the first sprocket 14 during a downshifting operation from the first sprocket 14 to the second sprocket 16.

As shown in FIGS. 2 to 4, each of the first shift regions 34 comprises a plurality of the first shifting teeth 32c. Here, the plurality (for example, two) of the first teeth 32a1 for gear shifting correspond to the first shifting teeth 32c.

Further, the two of the second teeth 32b adjacent to each of the first shifting teeth 32a1 for gear shifting correspond to the first shifting teeth 32c.

As shown in FIGS. 2 and 3, the first shifting teeth 32c comprise a first guide surface 32d. The first guide surface 32d is a surface for guiding the chain 2. The first guide surface 32d is provided to the first shifting teeth 32c, on the side of the first surface 14a (refer to FIG. 2) or on the side of the second surface 14b (refer to FIGS. 3 and 4) of the first sprocket 14. The first guide surface 32d is formed concavely, so that the thickness thereof gradually becomes thinner towards the side portion of the first shifting teeth 32c.

Further, each of the first shift regions 34 preferably comprises a first protrusion 36a and a second protrusion 36b. The first protrusions 36a and the second protrusions 36b are provided to the first sprocket body 30, and are configured to support the chain 2 during shifting operation. Here, a first pair of the first and second protrusions 36a and 36b is circumferentially spaced from a second pair of the first and second protrusions 36a and 36b in the circumferential direction of the first sprocket 14.

The first protrusions 36a are protrudingly provided on the second side surface 14b of the first sprocket body 30, for guiding the chain 2 to the teeth 32 of the first sprocket 14. For example, the first protrusions 36a guide the chain 2 to the second tooth 32b shown by the hatching in FIG. 3. The second protrusions 36b are protrudingly provided on the second side surface 14b of the first sprocket body 30, for guiding the chain 2 to the first protrusions 36a.

Further, as shown in FIGS. 3 and 4, each of the first shift regions 34 comprises a stepped portion 38. The stepped portions 38 are for facilitating the engagement of the chain 2, which is supported by one of the first protrusions 36a, with the teeth 32 of the first sprocket 14. The stepped portions 38 are provided on the first side surface 14a, radially inward from the tooth-bottoms of the plurality of teeth 32. Further, the stepped portions 38 are provided to the downstream side in the forward rotation direction R from the first protrusion 36a. The stepped portions 38 are concavely formed in a substantially triangular shape.

Second Sprocket

Figure 6:
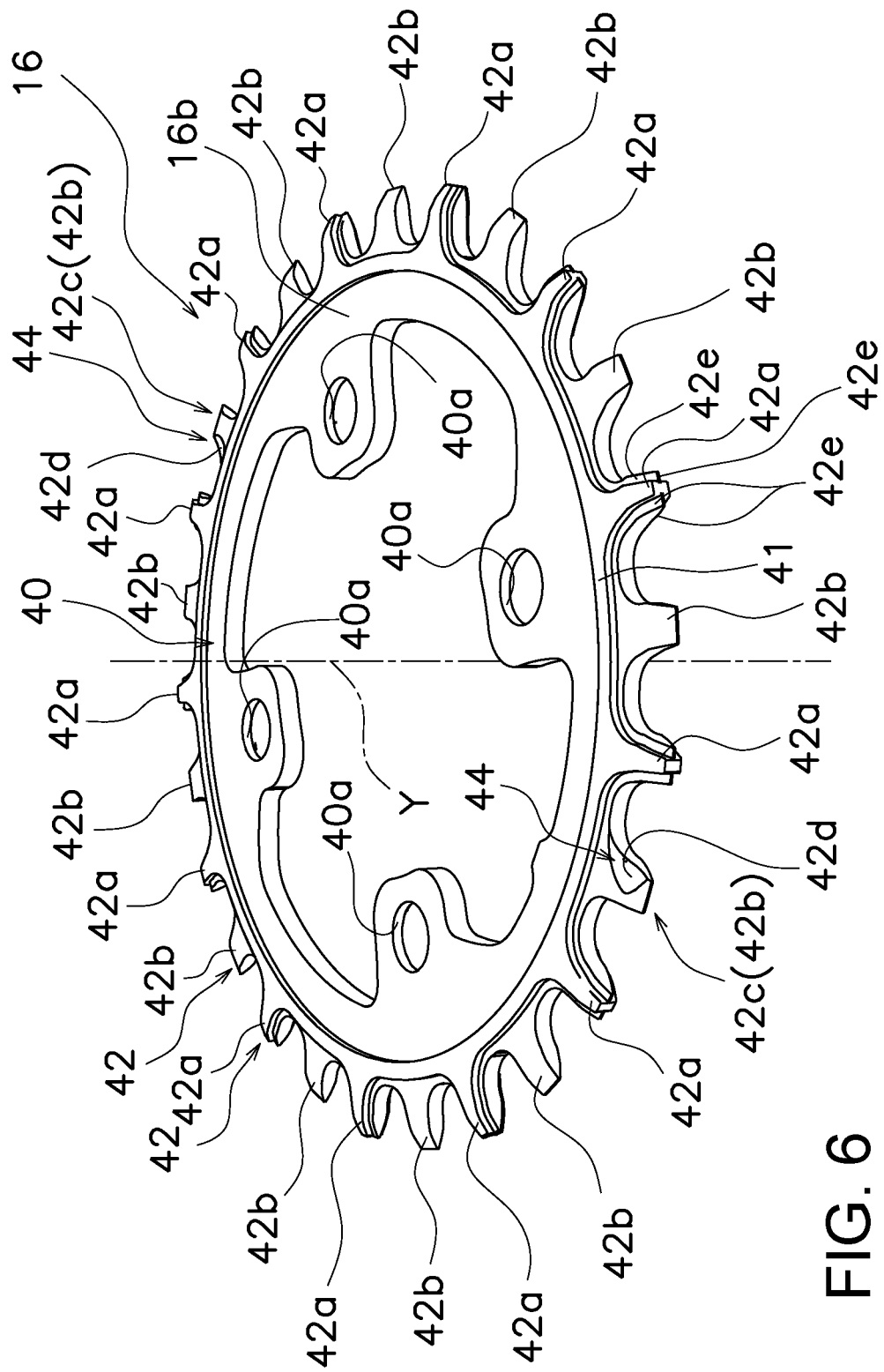
FIG. 6 is a front side oblique view of the second sprocket according to the first embodiment.

As shown in FIGS. 4 and 6, the second sprocket 16 comprises a rotational center axis Y. The rotational center axis Y and the rotational center axis X are concentric. The second sprocket 16 comprises a second sprocket body 40 (an example of a main body portion), a second annular portion 41 (an example of an annular portion), a plurality of teeth 42 (an example of a first tooth portion and a second tooth portion), and a pair of second shift regions 44 (an example of a shift region).

The second sprocket body 40 is made of metal, such as aluminum, titanium, or iron/stainless steel. The second sprocket body 40 comprises a plurality (for example, four) of second fixing portions 40a. The second fixing portions 40a are disposed in the circumferential direction with spaces therebetween.

Each of the second fixing portions 40a is, for example, a through-hole. Each of the second fixing portions 40a is disposed in an opposing position relative to each of the second attaching portions 24b. In this state, a second fixing bolt 28 is inserted through each second fixing portion 40a and each second attaching portion 24b, and the second fixing bolt 28 is screwed to a nut member (not shown). With this, the second sprocket body 40 is fixed to the sprocket attaching arms 24.

The second annular portion 41 is provided to the outer perimeter of the second sprocket body 40. The second annular portion 41 is made of metal, such as aluminum, titanium, or iron/stainless steel. A plurality of teeth 42 are formed on the outer perimeter of the second annular portion 41.

A plurality of teeth 42 includes a third tooth 42a and a fourth tooth 42b as described below. The teeth 42 are provided to the outer perimeter of the second annular portion 41. Specifically, the teeth 42 (for example, from a total number of 20 to 40) are disposed side-by-side in the circumferential direction on the outer perimeter of the second annular portion 41. The teeth 42 are formed integrally with the outer perimeter portion of the second annular portion 41. The teeth 42 are made of metal, such as aluminum, titanium, or, iron/stainless steel.

As mentioned above, the plurality of teeth 42 comprise a plurality of the third teeth 42a (an example of the first tooth) and a plurality of the fourth teeth 42b (an example of the second tooth). The third tooth 42a and the fourth tooth 42b are disposed alternately in the circumferential direction, that is, side-by-side in the circumferential direction.

The third tooth 42a is formed to be engageable with the outer link plates 2a. Specifically, the third tooth 42a is formed to be engageable between the pairs of the outer link plates 2a in the axial direction. The third tooth 42a is formed in a divergently tapered shape so that the width in the axial direction gradually becomes smaller toward the radially outer side.

As shown in FIG. 6, the third tooth 42a preferably comprises a second recess 42e (an example of a recess). The second recess 42e is provided to a corner portion of the third tooth 42a. The surface of the second recess 42e that is located on the first side surface 14a is flush with the surface of the fourth tooth 42b on the first side surface 14a. The surfaces of the second recesses 42e that are located on the second side surface 14b are flush with the surface of the fourth tooth 42b on the second side surface 14b.

The second recesses 42e are formed by press working, such as forging. Here, an example is shown of a case in which the second recesses 42e are formed by press working, but the second recesses 42e can also be formed by cutting.

The second recesses 42e are formed to face the end portion of the inner link plate 2b, in the same way as the first recess 32e described above to minimize interference between the third tooth 42a and the inner link plates 2b. In this way, excessive interference between the third tooth 42a and the inner link plates 2b can be avoided by the second recesses 42e. Further, as shown in FIGS. 4 and 6, by providing the second recesses 42e to the third tooth 42a, the third tooth 42a is formed in a substantially + (plus sign) shape, seen from a radially outer side.

As shown in FIG. 5, the third tooth 42a comprises a third maximum axial width W3 (an example of a first axial chain engaging width). The third maximum axial width W3 is the axial width of the portion where the dimension of the third tooth 42a is the longest in the axial direction. The third maximum axial width W3 is smaller than the first axial spacing L1. Further, the third maximum axial width W3 is larger than the second axial spacing L2 in the pairs of the inner link plates 2b.

As shown in FIGS. 4 to 6, the fourth tooth 42b is formed to be engageable with the inner link plates 2b. Specifically, the fourth tooth 42b is formed to be engageable between the pairs of the inner link plates 2b in the axial direction.

The fourth tooth 42b is formed in a substantially − (minus sign) shape, as seen from a radially outer side. The fourth tooth 42b is formed in a divergently tapered shape so that the width in the axial direction gradually becomes smaller toward the radially outer side.

As shown in FIG. 5, the fourth tooth 42b comprises a fourth maximum axial width W4 (an example of a second axial chain engaging width). The fourth maximum axial width W4 is the axial width of the portion where the dimension of the fourth tooth 42b is the longest in the axial direction. The fourth maximum axial width W4 is smaller than the second axial spacing L2. Further, the fourth maximum axial width W4 is smaller than the third maximum axial width W3.

The fourth tooth 42b is formed by processing the fourth tooth 42b in the following way, thereby obtaining the above configuration. The fourth tooth 42b is formed by deformation of the base material of the teeth 42. Specifically, the fourth tooth 42b is formed by press working. More specifically, the fourth tooth 42b is formed by forging. The fourth maximum axial width W4 of the fourth tooth 42b is set by press working, for example, forging the fourth tooth 42b in this way.

The second shift regions 44 are provided for gear shifting the chain 2. The second shift regions 44 are the regions in which the chain 2 engages with the teeth 42 of the first sprocket 14 during an upshifting operation from the second sprocket 16 to the first sprocket 14, and the regions in which the chain 2 separates from the teeth 42 of the first sprocket 14 during a downshifting operation from the first sprocket 14 to the second sprocket 16.

Each of the second shift regions 44 comprises a plurality (for example, two) of second shifting teeth 42c. The second shifting teeth 42c are provided in the circumferential direction with spaces therebetween. Each of the second shifting teeth 42c comprises a second guide surface 42d. The second guide surfaces 42d are provided on the fourth side surface 16b (refer to FIG. 6), which is on the opposite side of the third side surface 16a (refer to FIG. 1), and guides the chain 2. The second guide surfaces 42d are formed concavely, so that the thickness thereof gradually becomes thinner towards the side portion of the second shifting teeth 42c.

Here, the third side surface 16a of the second sprocket 16 is the front side surface of the crank assembly 10 when mounted on the bicycle. In other words, the third side surface 16a is an outwardly facing side surface that faces axially outward away from the bicycle frame. The fourth side surface 16b is the rear side surface of the crank assembly 10 when mounted on the bicycle. In other words, the fourth side surface 16b is an inwardly facing side surface that faces axially inward towards the bicycle frame. Thus, the fourth side surface 16b is located closer to the bicycle frame than is the third side surface 16a when the crank assembly 10 is mounted on the bicycle.

Here, an example is shown of a case in which the second shift regions 44 do not comprise the protrusion or recess such as in the case of the first shift regions 34. However, the second shift regions 44 can comprise at least either of a protrusion or a recess.

Shifting Operation in the Crank Assembly

In the crank assembly 10 configured in the way described above, the crank assembly 10 rotates in a forward rotation direction R when an upshifting operation is carried out from the second sprocket 16 to the first sprocket 14 by a front derailleur (not shown). In this state, when the front derailleur moves from a position opposed to the second sprocket 16 to a position opposed to the first sprocket 14, the chain 2 separates from the teeth of the second sprocket 16. Then, the chain 2, supported by one of the second protrusions 36b, is moved to the radially outer side. Then, the chain 2, supported by one of the first protrusions 36a via one of the stepped portions 38 of one of the first shift regions 34, is guided to and engages with the teeth 32 of the first sprocket 14.

On the other hand, the crank assembly 10 rotates in a forward rotation direction R when a downshifting operation is carried out from the first sprocket 14 to the second sprocket 16 by the front derailleur. In this state, when the front derailleur moves from a position opposed to the first sprocket 14 to a position opposed to the second sprocket 16, the chain 2 separates from the teeth of the first sprocket 14. Then, the chain 2 is guided to the teeth 42 of the second sprocket 16, and engages with the teeth 42.

Second Embodiment

As shown in FIG. 1, a bicycle crank assembly 110 according to the second embodiment is illustrated. The bicycle crank assembly 110 comprises the crank arm 12, a first sprocket 114 (an example of a bicycle sprocket) and a second sprocket 116 (an example of a bicycle sprocket). Further, the first sprocket 114 and the second sprocket 116 are an example of a bicycle sprocket assembly.

The configuration of the second embodiment is substantially the same as the first embodiment, except for the configurations of the first sprocket 114 and the second sprocket 116. Accordingly, here, only the descriptions for the configurations of the first sprocket 114 and the second sprocket 116 are given, and the descriptions for the configurations that are substantially the same as the first embodiment are omitted. Meanwhile, configurations omitted here shall be in accordance with the configurations of the first embodiment. Further, configurations that are the same as the first embodiment are given the same reference symbols.

The first sprocket 114 comprises the first sprocket body 30 (an example of a main body portion), the first annular portion 31 (an example of an annular portion), a plurality of teeth 132 (an example of a first tooth portion and a second tooth portion) and a pair of the first shift regions 34 (an example of a shift region).

Here, the configuration of the first sprocket body 30, the configuration of the first annular portion 31, and the configuration of the first shift region 34 are substantially the same as the configurations of the first embodiment, and thus the descriptions thereof are omitted. Further, regarding the configuration of the plurality of teeth 132, only the configurations that are different from the configurations of the first embodiment will be described below.

Figure 7:
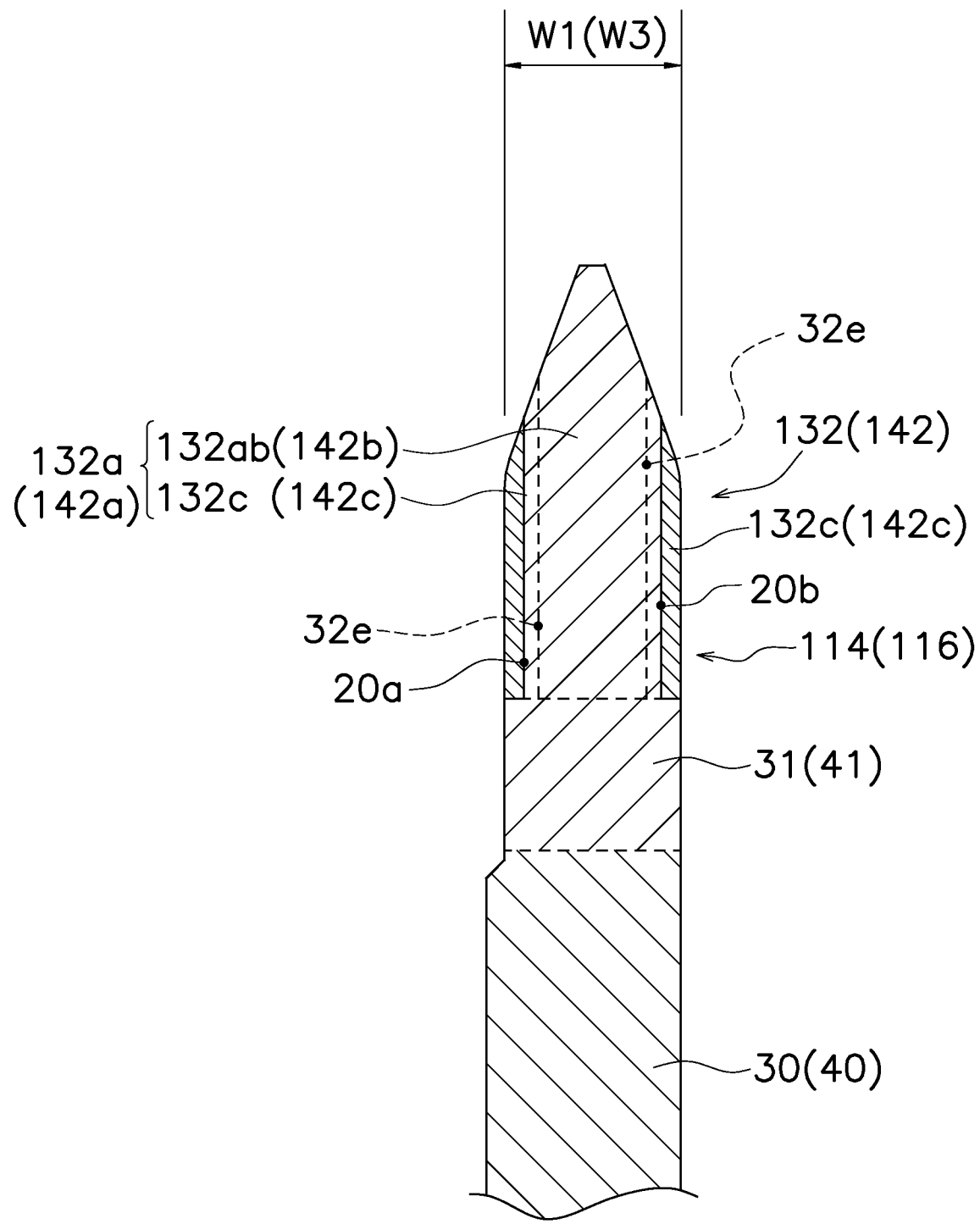
FIG. 7 is a cross-sectional view corresponding to the first tooth of the first sprocket and the third tooth of the second sprocket according to the second embodiment.

As shown in FIG. 7, each of the plurality of first teeth 132a (an example of the first tooth) included in the plurality of teeth 132 comprises a first main body portion 132ab, the first recesses 32e and a first additional portion 132c. The first recesses 32e are configured in the same way as in the first embodiment, and thus the description thereof is omitted.

The first main body portion 132ab is provided to the first annular portion 31. Specifically, the first main body portion 132ab is integrally formed with the first annular portion 31 so as to protrude radially outward from the first annular portion 31. The first main body portion 132ab comprises a front surface 20a and a back surface 20b. The back surface 20b is a surface on the opposite side of the front surface 20a in the axial direction of the rotational center axis X.

The first additional portion 132c is attached to the first main body portion 132ab to expand the width of the first main body portion 132ab. Specifically, the first additional portion 132c is attached on each of the front surface 20a and the back surface 20b of the first main body portion 132ab. A first maximum axial width W1 is set to a prescribed width by attaching the first additional portion 132c to each of the front surface 20a and the back surface 20b of the first main body portion 132ab in this manner. The first additional portion 132c is made of metal, such as aluminum, titanium, or iron/stainless steel. This first additional portion 132c is attached to the first tooth 132a by bonding, diffusion bonding, swaging or casting.

Here, an example is shown in which the first additional portion 132c is attached to each of the front surface 20a and the back surface 20b of the first main body portion 132ab. Instead of this, the first maximum axial width W1 can be set by attaching the first additional portion 132c to only the front surface 20a, or, only the back surface 20b, of the first main body portion 132ab.

The second sprocket 116 comprises the second sprocket body 40 (an example of a main body portion), the second annular portion 41 (an example of an annular portion), a plurality of teeth 142 (an example of a first tooth portion and a second tooth portion), and a pair of second shift regions 44 (an example of a shift region).

Here, the configuration of the second sprocket body 40, the configuration of the second annular portion 41, and the configuration of the second shift region 44 are substantially the same as the configurations of the first embodiment, and thus the descriptions thereof are omitted. Further, regarding the configuration of the plurality of teeth 142, only the configurations that are different from the configurations of the first embodiment will be described below.

Further, the teeth 142 include a plurality of third teeth 142a. Each of the third teeth 142a (examples of the first tooth) comprises a second main body portion 142b, and a second additional portion 142c. The configurations of the second main body portions 142b and the second additional portions 142c are substantially the same as the configurations of the above-described first main body portions 132ab and the first additional portions 132c. That is, the third maximum axial width W3 is set to a prescribed width by attaching the second additional portions 142c to each of the front surface 20a and the back surface 20b of the second main body portions 142b.

Other Embodiments

One embodiment of the present invention was described above, however the present invention is not limited to the above-described embodiment, and various modifications can be made without departing from the scope of the invention. In particular, the various embodiments and modified examples described in the present Specification can be freely combined according to necessity.

In the first and second embodiments, two front sprockets 14 and 16 (114, 116) were shown as an example of a bicycle sprocket assembly, but the present invention is not limited thereto. The present invention can be applied to a bicycle sprocket assembly provided with a single front sprocket that does not comprise a shift region.

(b) In the first and second embodiments, a case in which the second sprocket body 40 and the plurality of teeth 42 or 142 are formed integrally was shown as an example, but the present invention is not limited thereto. The second sprocket body 40 can be a separate body from the plurality of teeth 42 or 142. For example, the plurality of teeth 42 or 142 can be made of metal, while the second sprocket body 40 can be made of non-metal. In this case, weight reduction can be achieved by using aluminum, titanium, or iron/stainless steel for the metal, and synthetic resins such as carbon fiber-reinforced resin for the non-metal.

Figure 8:
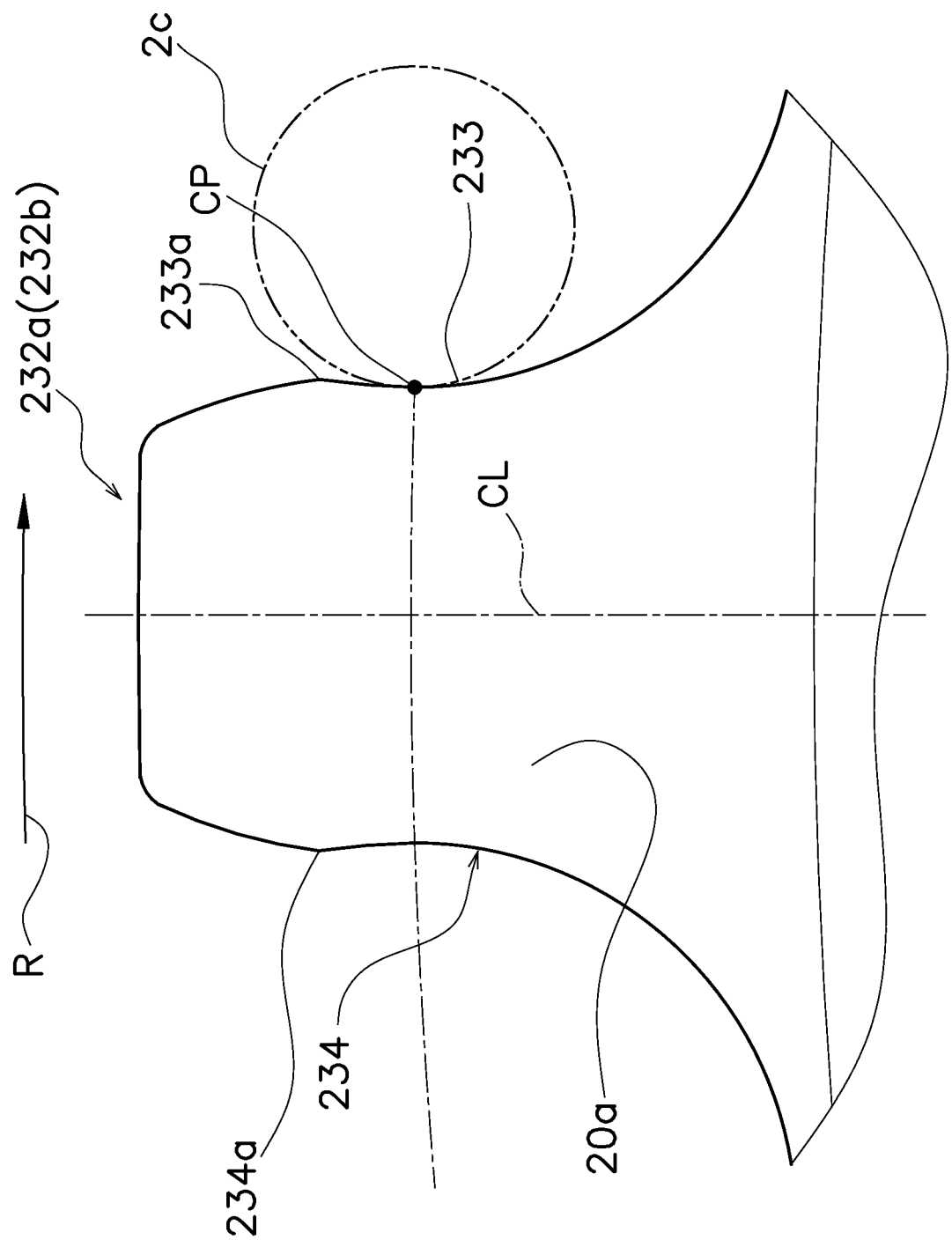
FIG. 8 is a front side view corresponding to the first tooth of the first sprocket and the third tooth of the second sprocket according to another embodiment of the present invention.

(c) The portion in which the first tooth 32a or 132a and the second tooth 32b engage with the chain roller 2c, and the portion in which the third tooth 42a or 142a and the fourth tooth 42b engage with the chain roller 2c, in the first and second embodiments, can be configured as shown in FIG. 8.

This configuration is substantially the same in the first sprocket 14 or 114 and the second sprocket 16 or 116. Thus, here, the configuration will be described using the first tooth 232a and the second tooth 232b of the first sprockets 14 and 114.

The chain roller 2c can be engaged between the first tooth 232a and the second tooth 232b (refer to FIGS. 1 and 5). As shown in FIG. 8, each of the first tooth 232a and the second tooth 232b comprises a drive surface 233 and a non-drive surface 234.

Since this configuration is substantially the same in the first tooth 232a and the second tooth 232b, here, a description will be given using the first teeth 232a.

Each of the first tooth 232a and the second tooth 232b comprises a front surface 20a, a back surface (not shown), a drive surface 233 and a non-drive surface 234. The back surface 20b is a surface on the opposite side of the front surface 20a in the axial direction of the rotational center axis X (the direction in FIG. 8 perpendicular to the paper surface).

The drive surface 233 is a surface that couples the front surface 20a and the back surface in the axial direction, to a downstream side in the forward rotation direction R. The drive surface 233 comprises a contact point CP and a first extension portion 233a (an example of a drive surface extension portion). The contact point CP is where the chain roller 2c comes into contact. Specifically, the contact point CP is where the chain roller 2c comes into contact with the drive surface 233 at the time of driving.

The first extension portion 233a is formed integrally with the drive surface 233. The first extension portion 233a extends in the circumferential direction radially outward from the contact point CP. Specifically, the first extension portion 233a protrudes towards the downstream side in the forward rotation direction R, radially outward from the contact portion CP.

The non-drive surface 234 is a surface that couples the front surface 20a and the back surface in the axial direction, to an upstream side in the forward rotation direction R. For example, the non-drive surface 234 is formed in line symmetry with the drive surface 233 with respect to a straight line CL that connects the rotational center axis X and the center position of the first tooth 232a (second tooth 232b) in the circumferential direction. The non-drive surface 234 can be formed unsymmetrically relative to the drive surface 233 with respect to the straight line CL that connects the rotational center axis X and the center position of the first tooth 232a (second tooth 232b) in the circumferential direction.

The non-drive surface 234 comprises a second extension portion 234a (an example of a non-drive surface extension portion). The radially outward movement of the chain roller 2c is suppressed by the second extension portion 234a. The second extension portion 234a is formed integrally with the non-drive surface 234. Here, since the non-drive surface 234 is formed in line symmetry with the drive surface 233, the second extension portion 234a extends to the opposite side of the first extension portion 233a in the circumferential direction. That is, the second extension portion 234a extends in a circumferential direction, for example, toward the upstream side in the forward rotation direction R.

Accordingly, the drive force of the first sprocket 14 can by reliably transmitted to the chain roller 2c, that is, the chain 2, by the drive surface 233. Further, the radially outward movement of the chain roller 2c can be reliably suppressed by the drive surface 233 and the non-drive surface 234.

Here, a case was shown as an example in which each of the first tooth 232a and the second tooth 232b comprises the drive surface 233 and the non-drive surface 234. Instead of this, the configuration can be such that only the first tooth 232a, or only the second tooth 232b comprise a drive surface 233 and a non-drive surface 234. Further, the first tooth 232a and/or the second tooth 232b can be configured to comprise only a drive surface 233, or only a non-drive surface 234.

(d) In the first and second embodiments, an example in which the front sprocket 14 and 16 are immovably mounted to the crankshaft 19 via the crank arm 12 was shown. Instead of this, the front sprockets 14 and 16 can move along the crankshaft 19 (rotational center axis X). Further, only a single front sprocket 14 can be used, where the front sprocket 14 moves along the crankshaft 19 (rotational center axis X) such as in the case of the front sprocket of the bicycle crank assembly that is disclosed in U.S. Patent Application Publication No. 2015/0274253A1.

(e) An outline of the front sprockets 14 and 16 shown in the above first and second embodiments can be formed by a 3D printer, after which the second tooth 32b and the fourth tooth 42b are formed by press working, such as forging.

(f) In the first and second embodiments described above, an example in which the first tooth 32a or 132a and the third tooth 42a or 142a are formed in a substantially + shape was shown, but the present invention is not limited thereto. For example, at least a portion of the first tooth 32a and the third tooth 42a can be of another shape, such as a rhombic shape, a trapezoidal shape, a triangular shape, a hexagonal shape, or an octagonal shape.

Figure 10:
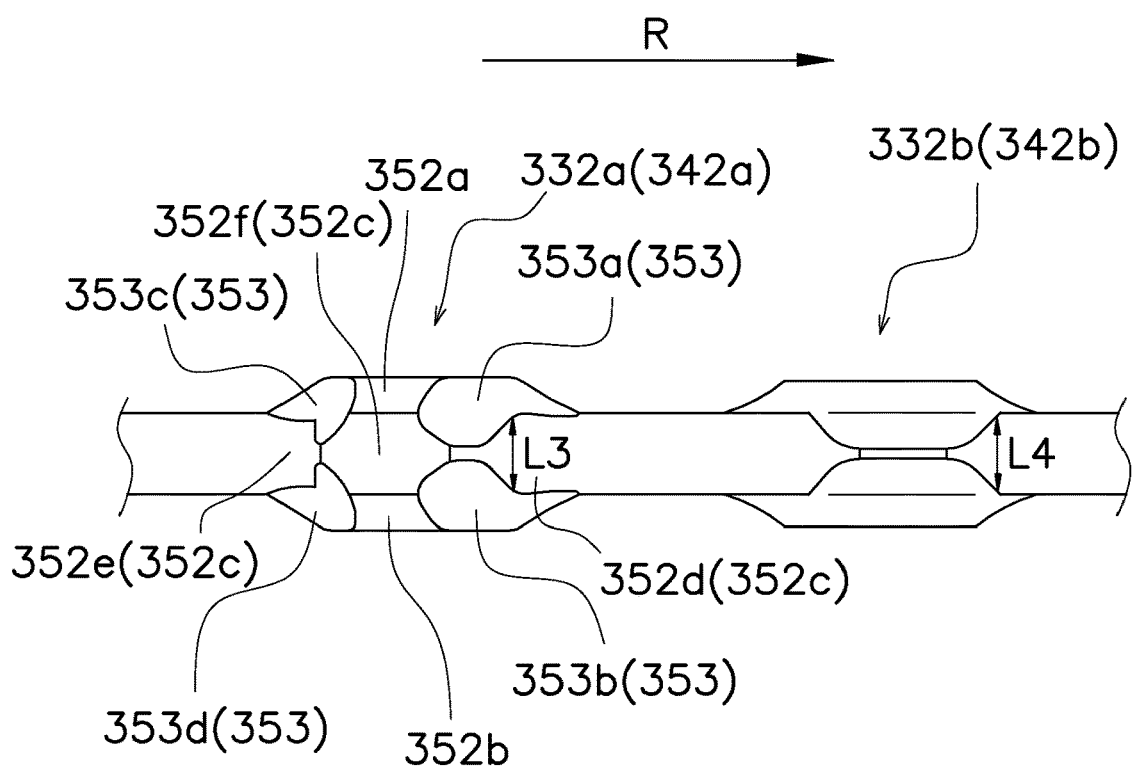
FIG. 10 is a partial edge view of the teeth portion of the first and second sprockets according to another embodiment, as seen from a radially outer side direction.

As shown in FIG. 10, first tooth 332a and/or third tooth 342a are preferably of an octagonal shape, as seen from the radial direction of the bicycle sprocket to minimize interference between the first tooth 332a and/or the third tooth 342a and the inner link plates 2b. In this case, excessive interference between the first tooth 332a and/or the third tooth 342a and the inner link plates 2b can be avoided, and a tooth-shape for securely holding the outer link plates 2a can be easily formed by press working, such as forging.

Here, an octagonal shape is not limited to a regular octagon shape, and may be any shape that has eight sides. Further, the eight sides that constitute the octagon are not limited to straight lines, and may be curved lines having a gentle curvature.

Figure 9:
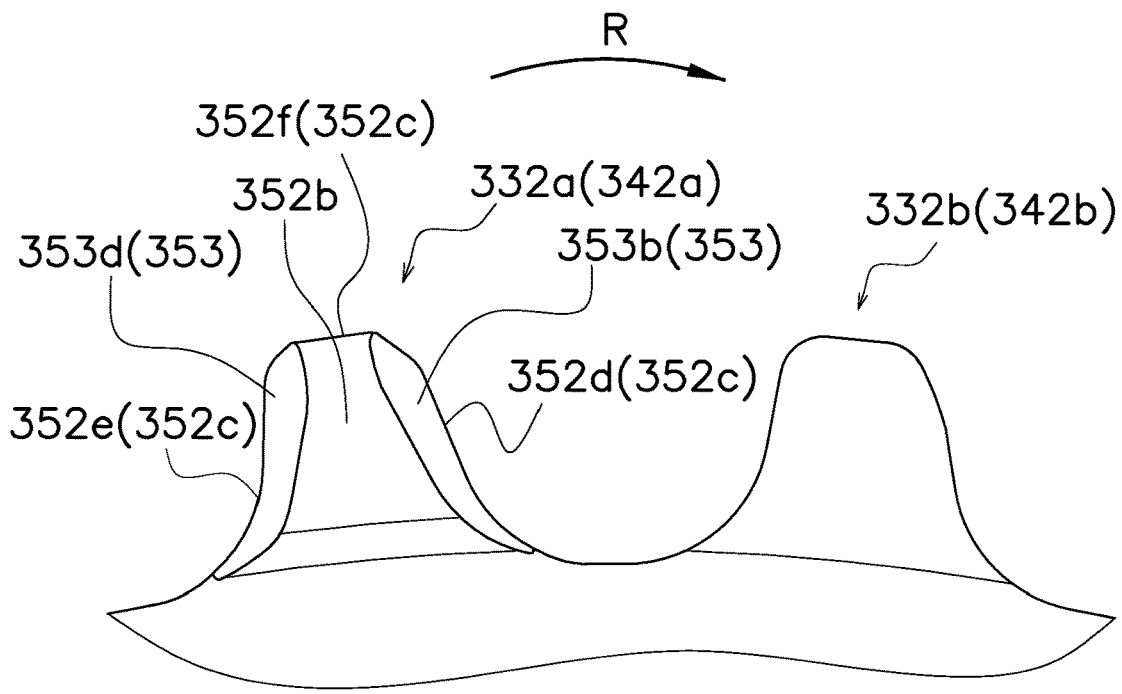
FIG. 9 is a partial front side view of the teeth portion of the first and second sprockets according to another embodiment.

Specifically, as shown in FIGS. 9 and 10, when the first tooth 332a and the third tooth 342a are of the octagonal shape described above, the first tooth 332a and the third tooth 342a comprise a first surface 352a, a second surface 352b, a third surface 352c and an inclined portion 353.

The first surface 352a is a surface of the first tooth 332a on the first side surface 14a side of the first sprocket 14, and a surface of the third tooth 342a on the third side surface 16a of the second sprocket 16.

The second surface 352b is a surface of the first teeth 332a on the second side surface 14b of the first sprocket 14, and a surface of the third tooth 342a on the fourth side surface 16b of the second sprocket 16.

The third surface 352c extends in the circumferential direction between the axial directions of the first surface 352a and the second surface 352b. The third surface 352c comprises a drive surface 352d, a non-drive surface 352e and a distal end surface 352f that couples the drive surface 352d and the non-drive surface 352e in the circumferential direction. The inclined portion 353 is configured to minimize (avoid excessive) interference with the inner link plates 2b. The inclined portion 353 comprises a first chamfered surface 353a, a second chamfered surface 353b, a third chamfered surface 353c and a fourth chamfered surface 353d.

The first chamfered surface 353a is formed to extend from the first surface 352a to the third surface 352c on the drive side. The second chamfered surface 353b is formed to extend from the second surface 352b to the third surface 352c on the drive side. The third chamfered surface 353c is formed to extend from the first surface 352a to the third surface 352c on the non-drive side. The fourth chamfered surface 353d is formed to extend from the second surface 352b to the third surface 352c on the non-drive side.

In other words, the first chamfered surface 353a is formed in a corner portion formed by the first surface 352a and the third surface 352c on the drive side. The second chamfered surface 353b is formed in corner portions formed by the second surface 352b and the third surface 352c on the drive side. The third chamfered surface 353c is formed in corner portions formed by the first surface 352a and the third surface 352c on the non-drive side. The fourth chamfered surface 353d is formed in corner portions formed by the second surface 352b and the third surface 352c on the non-drive side.

Here, the first tooth 332a and the third tooth 342a on the drive side, compared to the non-drive side, tend to more excessively interfere with the inner link plates 2b. Therefore, the first chamfered surface 353a and the second chamfered surface 353b, which are formed on the drive side, preferably have a larger area compared to the third chamfered surface 353c and the fourth chamfered surface 353d, which are formed on the non-drive side.

Excessive interference of the first tooth 332a and the third tooth 342a with the inner link plates 2b can be avoided by the first through fourth chamfered surfaces 353a, 353b, 353c and 353d. Further, the first through fourth chamfered surfaces 353a, 353b, 353c and 353d have a different shape from the recess in the above first and second embodiments, are inclined surfaces formed of straight or gently curved lines, and thus are easily formed by press working, such as forging.

Further, when the first tooth 332a and the third tooth 342a have an octagonal shape, a first axial direction contact width L3 of where the drive surface of the first tooth 332a and the third tooth 342a make contact with the chain roller 2c is preferably formed to be of substantially the same length as a second axial direction contact width L4 of where the drive surface of the second tooth 332b and the fourth tooth 342b make contact with the chain roller 2c.

(g) In the first and second embodiments described above, an example in which the first tooth 32a or 132a are formed in a substantially T-shape was shown, but the present invention is not limited thereto. For example, a portion of the first tooth 32a can be of another shape, such as a rhombic shape, a trapezoidal shape, a triangular shape, a hexagonal shape, or an octagonal shape.

(h) In the first and second embodiments described above, each of the first shift regions 34 comprises one of the second protrusions 36b, but the second protrusions 36b do not have to be provided.

(i) In the first and second embodiments described above, the number of the plurality of sprocket attaching arms 24 is four, but the number of the sprocket attaching arms is not limited to four.

(j) In the first and second embodiments described above, the first sprocket 14 can comprise a − (minus sign) shaped second tooth 32b in the first shift regions 34, and the second sprocket 16 can comprise a − (minus sign) shaped fourth tooth 42b in the second shift regions 44.

(k) In the second embodiment described above, an example was shown in which the additional portion of the first tooth 32a is made of metal, but the additional portion may be non-metallic. For example, when the additional portion is non-metallic, this additional portion is attached to the first tooth by bonding or integral molding. In this case, the noise caused during pedaling caused by contact between the chain and the sprocket teeth making can be reduced.

(l) At least one of the first tooth 32a or 132a or the second tooth 32b or 132b of the bicycle sprocket of the present invention can preferably comprise a plated layer.

For example, when the first teeth 32a or 132a and the second teeth 32b or 132b are made of aluminum, the plated layer is preferably a nickel plated layer, for the purpose of wear resistance. Further, when the first teeth 32a or 132a and the second teeth 32b or 132b are made of iron, the plated layer is preferably a nickel chrome plated layer, for the purpose of rust resistance.

Meanwhile, when the first tooth 32a or 132a and the second tooth 32b or 132b are made of iron, the tooth teeth 32a or 132a and the second tooth 32b or 132b, preferably comprise an electrodeposition coating layer, for the purpose of rust resistance and coloring.

(m) In the first and second embodiments described above, an example was shown in which the first sprocket 14 is configured to form the first sprocket body 30 made of synthetic resin, the first annular portion 31 and the first tooth portion 32b made of metal.

Alternatively, the first sprocket 14 can be configured from metal, and the first sprocket body 30, the first annular portion 31, and the first tooth portion 32b can be integrally molded. In this case, the first sprocket body 30, the first annular portion 31, and the first tooth portion 32b are formed of metal, such as aluminum, titanium, or iron/stainless steel.

Figure 11:
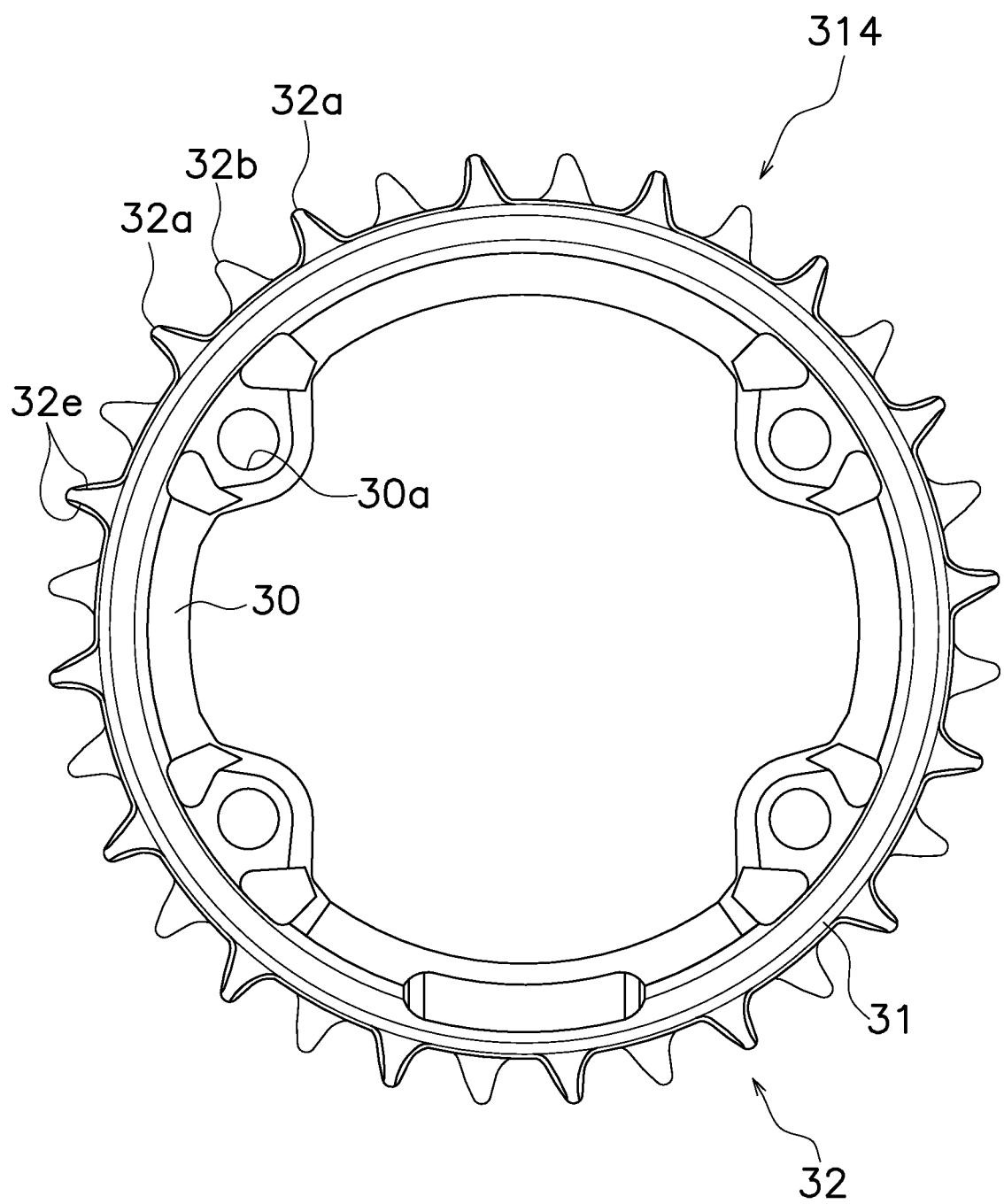
FIG. 11 is a front side elevational view of the first sprocket according to another embodiment.

An example of the first sprocket 314 configured in this way is shown in FIG. 11. The configuration in FIG. 11 is substantially the same as the first and second embodiments described above, and the typical configurations are given the same reference symbols as the first embodiment.

Figure 12A:
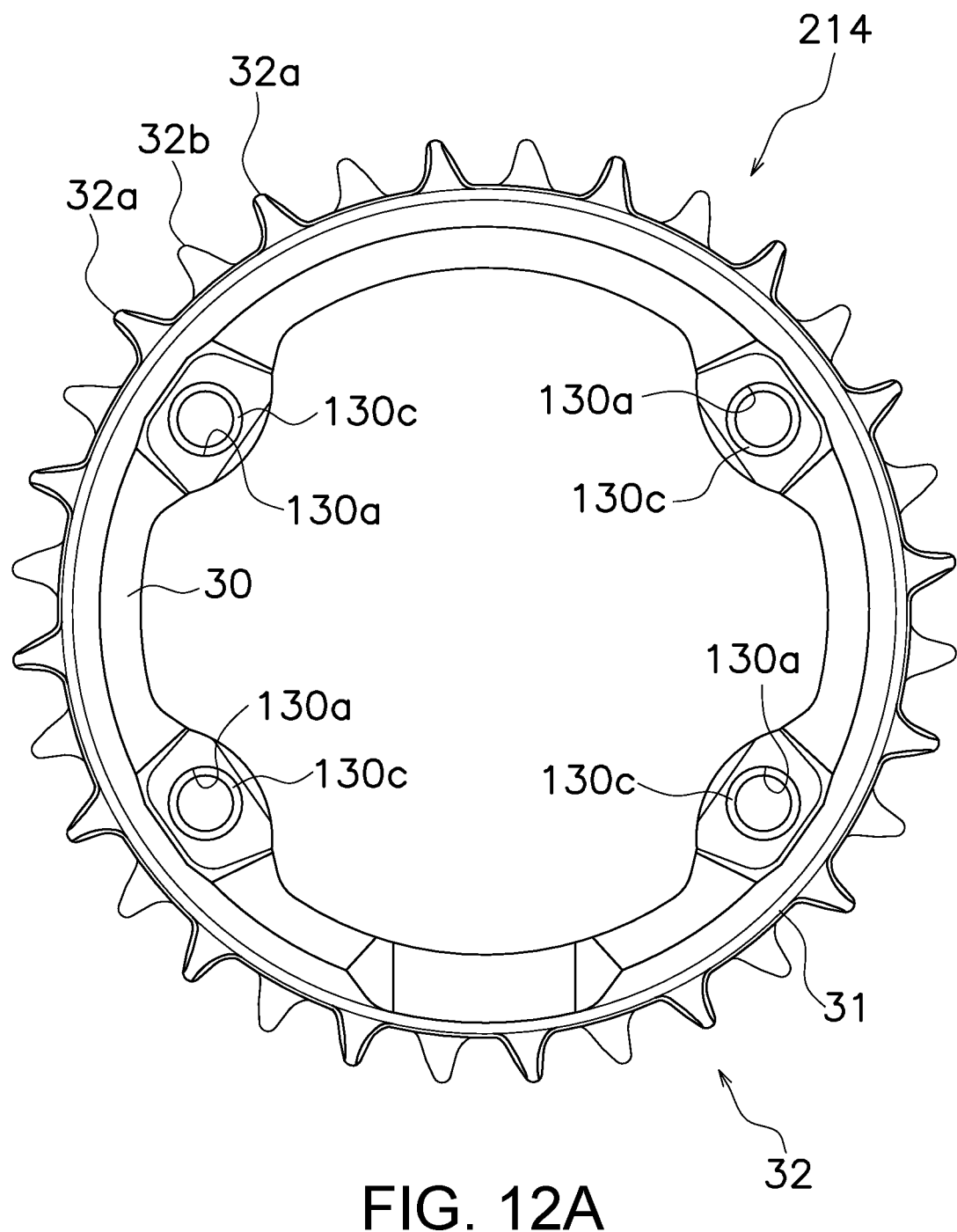
FIG. 12A is a front side elevational view of the first sprocket according to another embodiment.
Figure 12B:
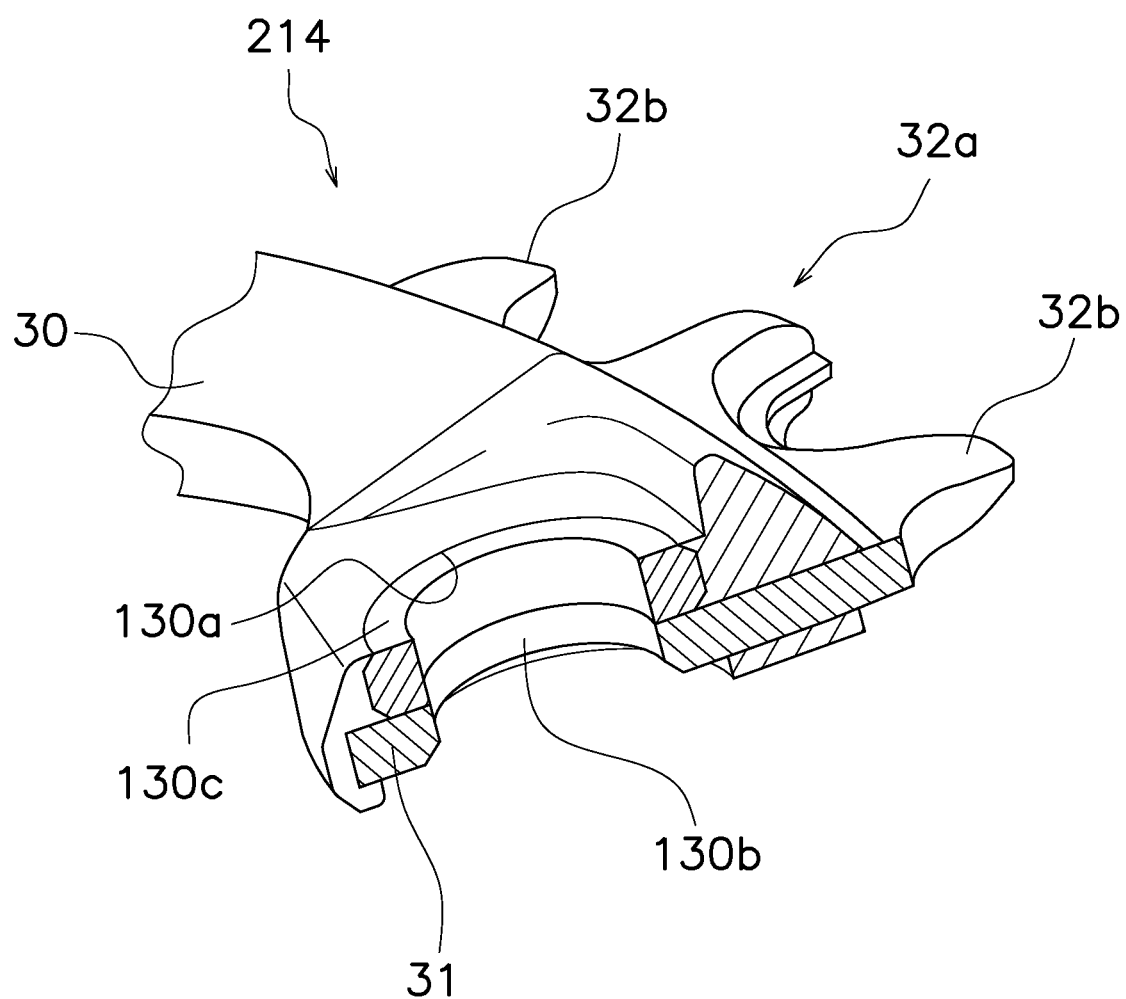
FIG. 12B is a partial cross-sectional view of the first sprocket illustrated in FIG. 12A.

(n) Instead of the first sprocket 14 or 114 of the first and second embodiments described above, a first sprocket 214 can be configured as shown in FIGS. 12A and 12B. Meanwhile, in FIGS. 12A and 12B, configurations that are substantially the same as the first and second embodiments described above are given the same reference symbols as the first embodiment.

In the first sprocket 214, a first through-hole 130a is provided to the first sprocket body 30. Further, a second through-hole 130b is provided to the first annular portion 31. A ring member 130c, such as a washer, is disposed in the first through-hole 130a. Specifically, the first sprocket body 30 is integrally molded with the first annular portion 31 and the ring member 130c, so that the inner perimeter surface of the ring member 130c is substantially flush with the inner perimeter surface of the second through-hole 130b.

When the first sprocket 214 is configured in this way, one of the first fixing bolts 26 is inserted into each of the ring members 130c, each of the second through-holes 130b, and each of the first attaching portions 24a, and is then screwed to a nut member (not shown). With this, the first sprocket body 30 is fixed to the sprocket attaching arms 24.

(o) In the first and second embodiments described above, an example was shown in which the second tooth 32b of the first sprocket 14 are formed by press working, such as forging, together with the first recess 32e. Instead of this, as shown in part (A) of FIG. 13-part (D) of FIG. 13, the second tooth 32b can be formed by press working (such as forging) and a cutting process. In part (A) of FIG. 13-part (D) of FIG. 13, each step is schematically represented for ease of description.

Figure 13:
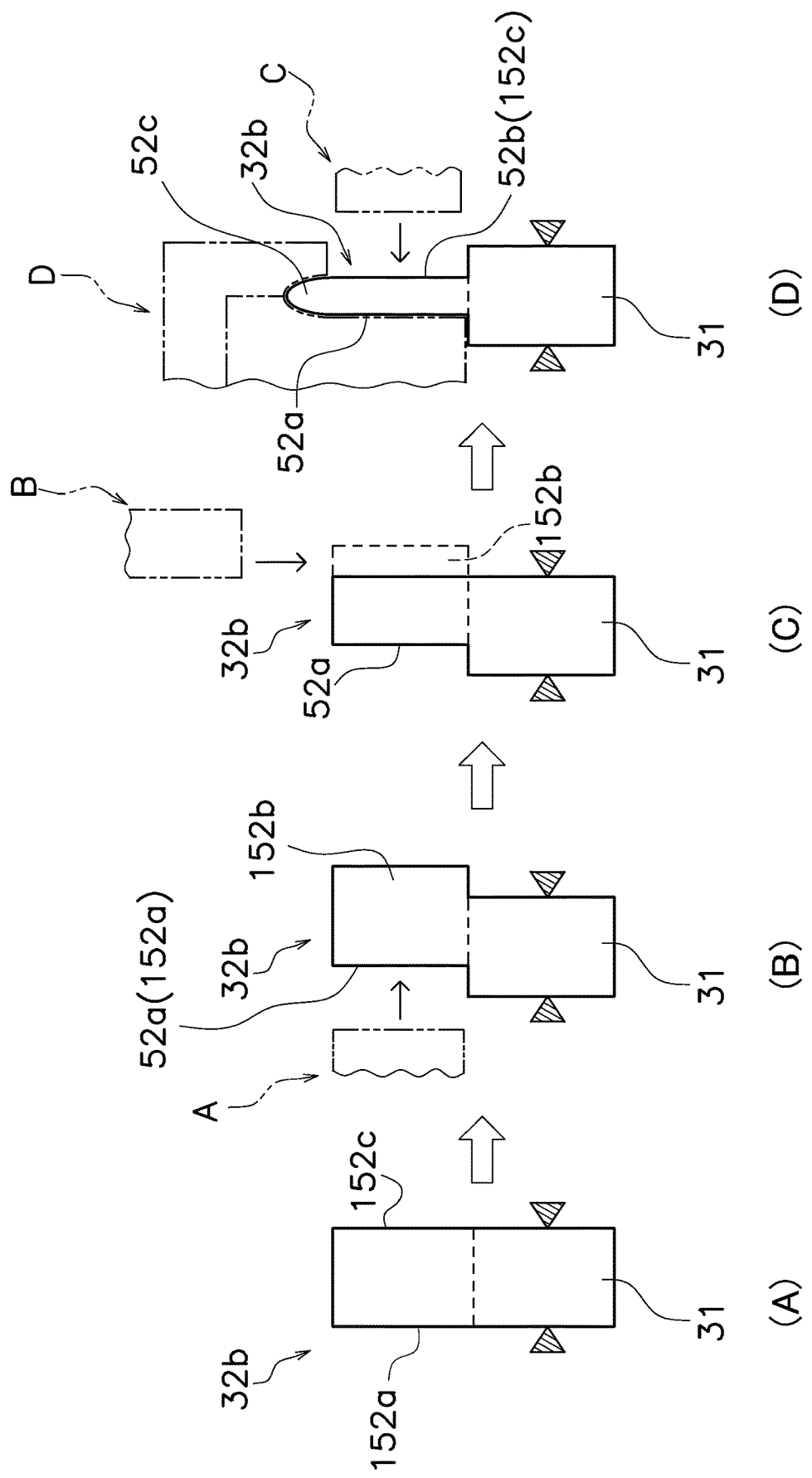
FIG. 13 is a schematic diagram illustrating a forming state of the second tooth and the fourth tooth according to another embodiment.

In this case, the second tooth 32b are formed by a first pressing step (refer to part (B) of FIG. 13), a cutting step (refer to part (C) of FIG. 13) after the first pressing step, and a second pressing step (refer to part (D) of FIG. 13) after the cutting step.

As shown in part (D) of FIG. 13, the second tooth 32b comprise a fifth surface 52a (an example of a first surface) and a sixth surface 52b (an example of a first surface). For example, the fifth surface 52a is formed on the second tooth 32a, on the first side surface 14a (refer to FIG. 2) of the first sprocket 14. The sixth surface 52b is a surface that is located on the opposite side of the fifth surface 52a in an axial direction parallel to the rotational center axis X. For example, the sixth surface 52b is formed on the second tooth 32b, on the second side surface 14b (refer to FIG. 4) of the first sprocket 14.

Specifically, as shown in part (A) of FIG. 13, in the initial state, the surface on which the fifth surface 52a of the second tooth 32b is formed (first pressing portion 152a described below) and the surface on which the sixth surface 52b is formed (second pressing portion 152c described below) are formed on substantially the same surface as the outer surface of the first annular portion 31 of the first sprocket 14.

A first pressing step is a process for pressing the fifth surface 52a of the second tooth 32b. As shown in part (B) of FIG. 13, in the first pressing step, with the first annular portion 31 in a fixed state, the fifth surface 52a of the second tooth 32b is pressed by a pressing member A of a pressing device (not shown).

Here, the first pressing portion 152a where the pressing member A presses, is the portion where the second tooth 32b and the first recess 32e are formed. In this way, when the pressing member A presses the first pressing portion 152a, the fifth surface 52a of the second tooth portion 32b is formed, and a portion on the sixth surface 52b protrudes, which is located substantially on the opposite side of the first pressing portion 152a. Hereinafter, this portion will be referred to as the protrusion 152b.

The cutting step is a process for cutting the protrusion 152b, which protrudes in the axial direction due to the first pressing step, on the sixth surface 52b of the second tooth 32b. As shown in part (C) of FIG. 13, in the cutting step, the protrusion 152b formed on the sixth surface 52b is cut by a cutting device B. Specifically, the protrusion 152b is cut by the cutting device B so that the surface remaining after cutting is substantially the same surface as the outer surface of the first annular portion 31.

A second pressing step is a step for pressing the sixth surface 52b side of the second tooth 32b. As shown in part (D) of FIG. 13, in the second pressing step, in a state in which a mold D for forming the outer shape of the second tooth 32b is abutting the first pressing portion 152a, the sixth surface 52b side of the second tooth 32b is pressed by a pressing member C of the pressing device.

Here, the second pressing portion 152c where the pressing member C presses, is the portion where the tooth teeth 32b and the first recess 32e are formed. In this way, when the pressing member C presses the second pressing portion 152c, the sixth surface 52b of the second tooth portion 32b is formed. Further, the teeth edge 52c of the second tooth portion 32b as well as the fifth surface 52a and the sixth surface 52b are formed.

As described above, the second tooth 32b can be formed by using the first pressing step, the cutting step and the second pressing step. Meanwhile, after the second tooth 32b are formed in the above way, a polishing step for adjusting the shape of the second tooth 32b, and a plating step (preferably, a nickel plating process) for improving the wear resistance of the second tooth 32b can be added selectively.

Here, an example was shown in which the second tooth 32b are formed by press working and a cutting process, but the fourth tooth 42b of the second sprocket 16 can be formed in the same way as well.

(p) In the first and second embodiments and the other embodiments described above, front sprockets 14 and 16 were shown as examples of a bicycle sprocket, but the present invention is not limited thereto. The present invention can be applied to a rear sprocket as well.

The present invention can be widely applied to bicycle sprockets and bicycle sprocket assemblies.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of making a bicycle sprocket having a rotational center axis, the method comprising:
    providing an annular portion made of a base material and having a plurality of teeth integrally formed on an outer perimeter of the annular portion;
    after providing the annular portion, processing at least one of the plurality of teeth to form a first tooth having a first axial chain engaging width that is smaller than a first axial spacing of an outer link of a bicycle chain and larger than a second axial spacing of an inner link coupled to the outer link;
    forming a recess in the first tooth, the recess being configured to minimize interference with the inner link; and
    processing at least one other of the plurality of teeth to form a second tooth having a second axial chain engaging width that is smaller than the second axial spacing, the second tooth being formed by deforming the base material,
    the recess and the second tooth being formed together by press working after the first tooth is formed.

2. The method according to claim 1, further comprising forming four of the recesses in the first tooth such that the first tooth has a plus-sign shape when viewed from a radially outer side.

3. The method according to claim 2, further comprising forming the four recesses and the second tooth together by the press working.

4. The method according to claim 1, wherein the processing to form the second tooth includes a first press working step, a cutting step performed after the first press working step, and a second press working step performed after the cutting step.

5. The method according to claim 4, wherein the first press working step includes pressing one axial side of the second tooth and forming a protrusion on an opposite axial side of the second tooth,
    the cutting step includes cutting the protrusion, and
    the second press working step includes pressing the opposite axial side of the second tooth to achieve the second axial chain engaging width.

* * * * *